(12) United States Patent
Ozdas et al.

(10) Patent No.: US 10,453,245 B2
(45) Date of Patent: Oct. 22, 2019

(54) QUERY RESOLVER FOR GLOBAL ILLUMINATION OF 3-D RENDERING

(71) Applicant: Imagination Technologies Limited, Kings Langley (GB)

(72) Inventors: Cuneyt Ozdas, San Francisco, CA (US); Luke Tilman Peterson, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 43 days.

(21) Appl. No.: 15/618,548

(22) Filed: Jun. 9, 2017

(65) Prior Publication Data

US 2017/0278297 A1    Sep. 28, 2017

Related U.S. Application Data

(63) Continuation of application No. 14/203,094, filed on Mar. 10, 2014, now Pat. No. 9,704,283.

(Continued)

(51) Int. Cl.
| | | |
|---|---|---|
| *G06T 15/06* | (2011.01) | |
| *G06T 15/08* | (2011.01) | |
| *G06T 15/60* | (2006.01) | |

(52) U.S. Cl.
CPC ............ *G06T 15/06* (2013.01); *G06T 15/08* (2013.01); *G06T 15/60* (2013.01); *G06T 2215/06* (2013.01); *G06T 2215/12* (2013.01)

(58) Field of Classification Search
CPC ....... G06T 15/005; G06T 15/08; G06T 15/80; G06T 15/06; G06T 15/506; G06T 15/50; G06T 17/005
See application file for complete search history.

(56) References Cited

U.S. PATENT DOCUMENTS

| | | | |
|---|---|---|---|
| 6,023,279 A | 2/2000 | Sowizral et al. | |
| 6,229,553 B1 | 5/2001 | Duluk et al. | |

(Continued)

FOREIGN PATENT DOCUMENTS

| | | |
|---|---|---|
| CN | 101165721 A | 4/2008 |
| CN | 102947865 A | 2/2013 |
| WO | 2013022804 A1 | 2/2013 |

OTHER PUBLICATIONS

Crassin, Cyril, et al. "Interactive indirect illumination using voxel cone tracing." Computer Graphics Forum. vol. 30. No. 7. Oxford, UK: Blackwell Publishing Ltd, 2011. (Year: 2011).*

(Continued)

*Primary Examiner* — Xiao M Wu
*Assistant Examiner* — Scott E Sonners
(74) *Attorney, Agent, or Firm* — Vorys, Sater, Seymour and Pease LLP; Vincent M DeLuca

(57) ABSTRACT

Rendering system combines point sampling and volume sampling operations to produce rendering outputs. For example, to determine color information for a surface location in a 3-D scene, one or more point sampling operations are conducted in a volume around the surface location, and one or more sampling operations of volumetric light transport data are performed farther from the surface location. A transition zone between point sampling and volume sampling can be provided, in which both point and volume sampling operations are conducted. Data obtained from point and volume sampling operations can be blended in determining color information for the surface location. For example, point samples are obtained by tracing a ray for each point sample, to identify an intersection between another surface and the ray, to be shaded, and volume samples are obtained from a nested 3-D grids of volume (Continued)

elements expressing light transport data at different levels of granularity.

18 Claims, 13 Drawing Sheets

Related U.S. Application Data

(60) Provisional application No. 61/787,700, filed on Mar. 15, 2013.

(56) References Cited

U.S. PATENT DOCUMENTS

| | | | |
|---|---|---|---|
| 6,380,935 | B1 | 4/2002 | Heeschen et al. |
| 7,009,608 | B2 | 3/2006 | Pharr et al. |
| 7,030,879 | B1 | 4/2006 | Pharr |
| 7,071,983 | B2 | 7/2006 | Herken |
| 7,102,646 | B1 | 9/2006 | Rubinstein et al. |
| 7,145,562 | B2 | 12/2006 | Schechter et al. |
| 7,310,100 | B2 | 12/2007 | Hussain |
| 7,324,115 | B2 | 1/2008 | Fraser |
| 7,348,975 | B2 | 3/2008 | Reshetov et al. |
| 7,405,734 | B2 | 7/2008 | Foran |
| 7,479,962 | B2 | 1/2009 | Herken |
| 7,483,024 | B2 | 1/2009 | Maillot |
| 8,018,457 | B2 | 9/2011 | Peterson et al. |
| 2005/0264568 | A1 | 12/2005 | Keller |
| 2006/0072614 | A1 | 4/2006 | Ogiso et al. |
| 2006/0111099 | A1 | 5/2006 | Abdel-Kader |
| 2006/0139350 | A1 | 6/2006 | Reshetov |
| 2007/0132754 | A1 | 6/2007 | Reshetov et al. |
| 2009/0167763 | A1 | 7/2009 | Waechter et al. |
| 2009/0284523 | A1 | 11/2009 | Peterson et al. |
| 2010/0060634 | A1 | 3/2010 | Wald et al. |
| 2010/0194751 | A1 | 8/2010 | Wald et al. |
| 2013/0113800 | A1 | 5/2013 | McCombe et al. |

OTHER PUBLICATIONS

Djeu et al, "Razor: An Architecture for Dynamic Multiresolution Ray Tracing," University of Texas at Austin Department of Computer Sciences, Technical Report #07-52 Jan. 24, 2007.
A.J. van der Pioeg, "Interactive Ray Tracing, the replacement of rasterization?" B.Sc. thesis, VU University Amsterdam, The Netherlands, Dec. 2006. (Available at http://www.cs.vu.nl/.about.kielmann/theses/avdpioeg.pdf, last visted on Mar. 31, 2008.).
Andreas Dietrich, Ingo Wald, Carsten Benthin and Philipp Slusallek, "The OpenRT Application Programming Interace—Towards a Common API for Interactive Ray Tracing—" OpenSG, Darmstadt, Germany (Available online at http://graphics.cs/uni-sb.de/fileadmin/cgunds/papers/2003/opensg03/The- OpenRTAPI.sub.-OpenSG2003.ppt, last visited Sep. 21, 2009).
Crassin, C., Neyret, F., Sainz, M., Green, S., & Eisemann, E. (Sep. 2011). Interactive indirect illumination using voxel cone tracing. In Computer Graphics Forum (vol. 30, No. 7, pp. 1921-1930). Blackwell Publishing Ltd.
E. Mansson, J. Munkberg and T. Akenine-Moller, "Deep Coherent Ray Tracing," RT 07—Symposium on Interactive Ray Tracing 2007, Sep. 10-12, 2007, pp. 79-85. (Available at http://graphics.csith.se/research/papers/2007/deepcoh/deepcoherent.pdf, last visited Jan. 7, 2008.).
F James, "Monte Carlo theory and practice," Reports on Progress in Physics, vol. 43, 1980, pp. 1145-1189, The Institute of Physics, Great Britain.
Fan et al. "Population monte carlo samplers for rendering" Technical report 1613 available at http://ftp.cs.wisc.edu/pub/techreports/2007/TR1613.pdf last checked Nov. 28, 2012.
H. Du, M. Sanchez-Elez, N. Tabrizi, N. Bagherzadeh, M.L. Anido and M. Fernandez, "Interactive Ray Tracing on Reconfigurabie SIMD MorphoSys," Proceedings of the Design, Automation and Test in Europe Conference and Exhibition, 2003, Asia and South Pacific Jan. 21-24, 2003, pp. 471-476.
H. Friedrich, J. Gunther, A. Dietrich, M. Scherbaum, H-P Seidel and P. Slusallek, "Exploring the Use of Ray Tracing for Future Games," Proceedings of the 2006 ACM SIGGRAPH symposium on Videogames , Boston, MA, pp. 41-50, 2006.
Havran, et al. "On the Fast Construction of Spatial Hierarchies for Ray Tracing" IEEE Symposium on Interactive Ray Tracing 2006, pp. 71-80.
Heitz, E., & Neyret, F. (Jun. 2012). Representing appearance and pre-filtering subpixel data in sparse voxel octrees. In Proceedings of the Fourth ACM SIGGRAPH/Eurographics conference on High-Performance Graphics (pp. 125-134). Eurographics Association.
I. Wald, P. Slusaliek and C. Benthin, "Interactive Distributed Ray Tracing of Highly Complex Models," Rendering Techniques 2001—Proceedings of the 12th Europgraphics Workshop on Render, pp. 274-285, London, England, Jun. 2001.
Johannes Gunther et al: "Realtime Ray Tracing on GPU with BVH-based Packet Traversal", Interactive Ray Tracing, 2007. RT '07.IEEE Symposium on, IEEE, PI, Sep. 10, 2007 (Sep. 10, 2007),-Sep. 12, 2007 (Sep. 12, 2007), pp. 113-118, XP031142292.
John Amanatides, "Ray Tracing with Cones," ACM SIGGRAPH Computer Graphics 18(3), Jul. 1984, pp. 129-135.
Lauterback "Ray-Strips: A Compact Mesh Representation for Interactive Ray Tracing" IEEE Symposium Interative Ray Tracing 2007.
Overbeck, R., Ramamoorthi, R., & Mark, W. R. (Aug. 2008). Large ray packets for real-time Whiffed ray tracing. In Interactive Ray Tracing, 2008. RT 2008. IEEE Symposium on (pp. 41-48). IEEE.
P. A. Navratil, D. S. Fussell and C. Lin, "Dynamic Ray Scheduling for Improved System Performance," The University of Texas at Austin, Technical Report TR-07-19, Apr. 12, 2007.
Schlick, Christophe. "A survey of shading and reflectance models." Computer Graphics Forum. vol. 13. No. 2. Blackwell Science Ltd, 1994.
Seitz et al. "Toward Image-Based Scene Representation Using View Morphing" Technical Report #1298 May 1996 Department of Computer Sciences University of Wisconsin.
Turk, Greg, and James F. O'Brien. "Modelling with implicit surfaces that interpolate." ACM Transactions on Graphics (TOG) 21.4 (2002): 855-873.
W.R. Mark and D. Fussell, "Real-Time Rendering Systems in 2010," The University of Texas at Austin, Department of Computer Sciences, Technical Report # TR-05-18, May 2, 2005. (Available at http://www-csl.csres.utexas.edu/users/billmark/papers/rendering2010-TR/TR- 05-18-Rendering2010.pdf, last visited Jan. 7, 2008.).
Wachter "Quasi-Monte Carlo Light Transport Simulation by Efficient Ray Tracing" Phd Disseration (2008) Ulm University http://vts.uni-ulm.de/query/longview.meta.asp?document_id=6265.
Xu "A New Adaptive Sampling Technique for Monte Carlo Global Illumination" 10th IEEE International Conference on Computer-Aided Design and Computer Graphics, 2007.
Zhao, Ye et al. "Voxels on Fire" IEEE Visualization 2003 Oct. 19-24, 2003.
Crassin et al., "Interactive Indirect Illumination Using Voxel Cone Tracing," Computer Graphics Forum, vol. 30, No. 7, Blackwell Publishing Ltd, 2011.
Marmitt et al., "Interactive Volume Rendering with Ray Tracing," Eurographics State of the Art Reports (2006), pp. 115-136.
Thiedemann et al., "Voxel-based Global Illumination," Symposium on Interactive 3D Graphics and Games, ACM 2011.
NPL in Parent APN \* cited by examiner

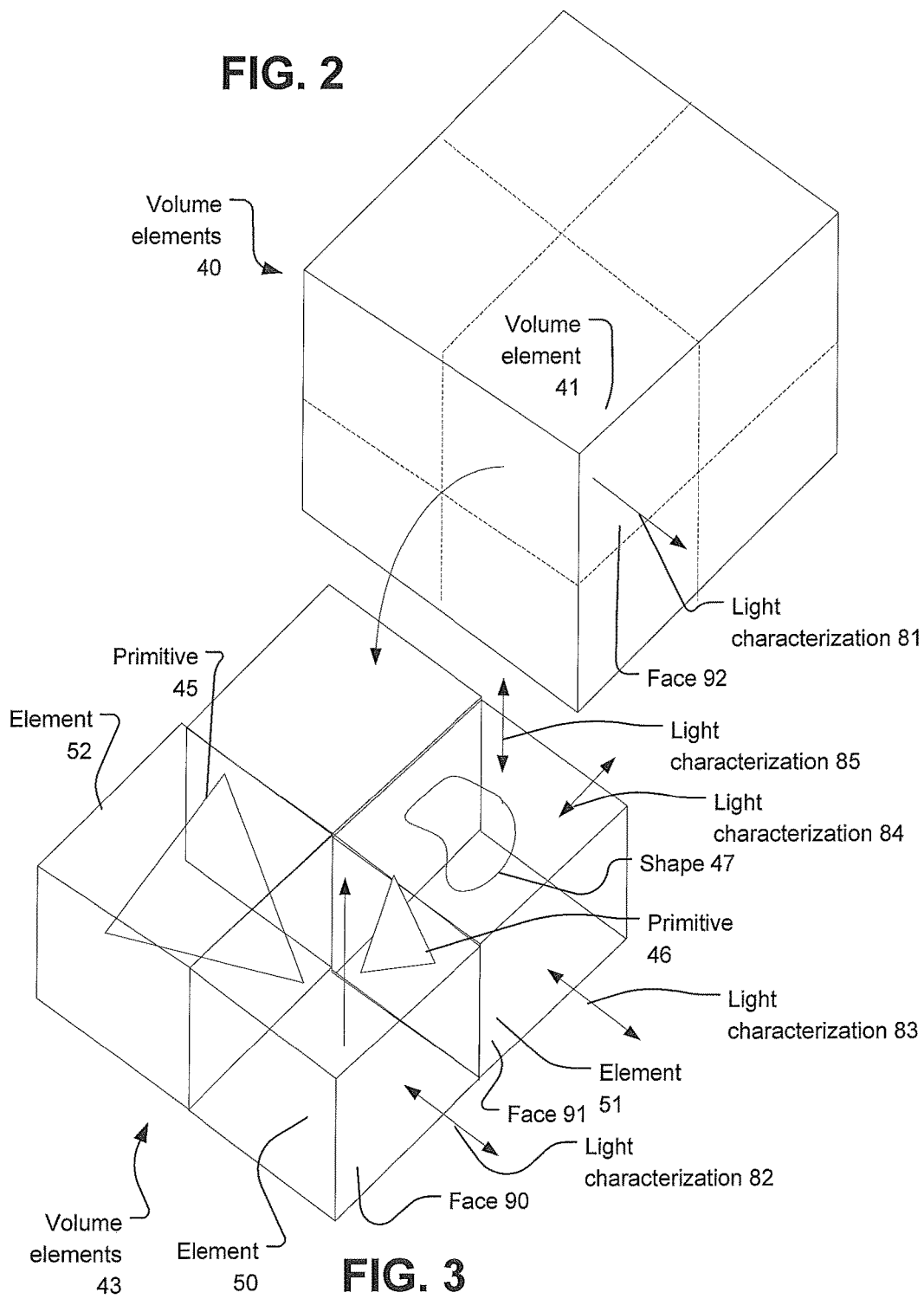

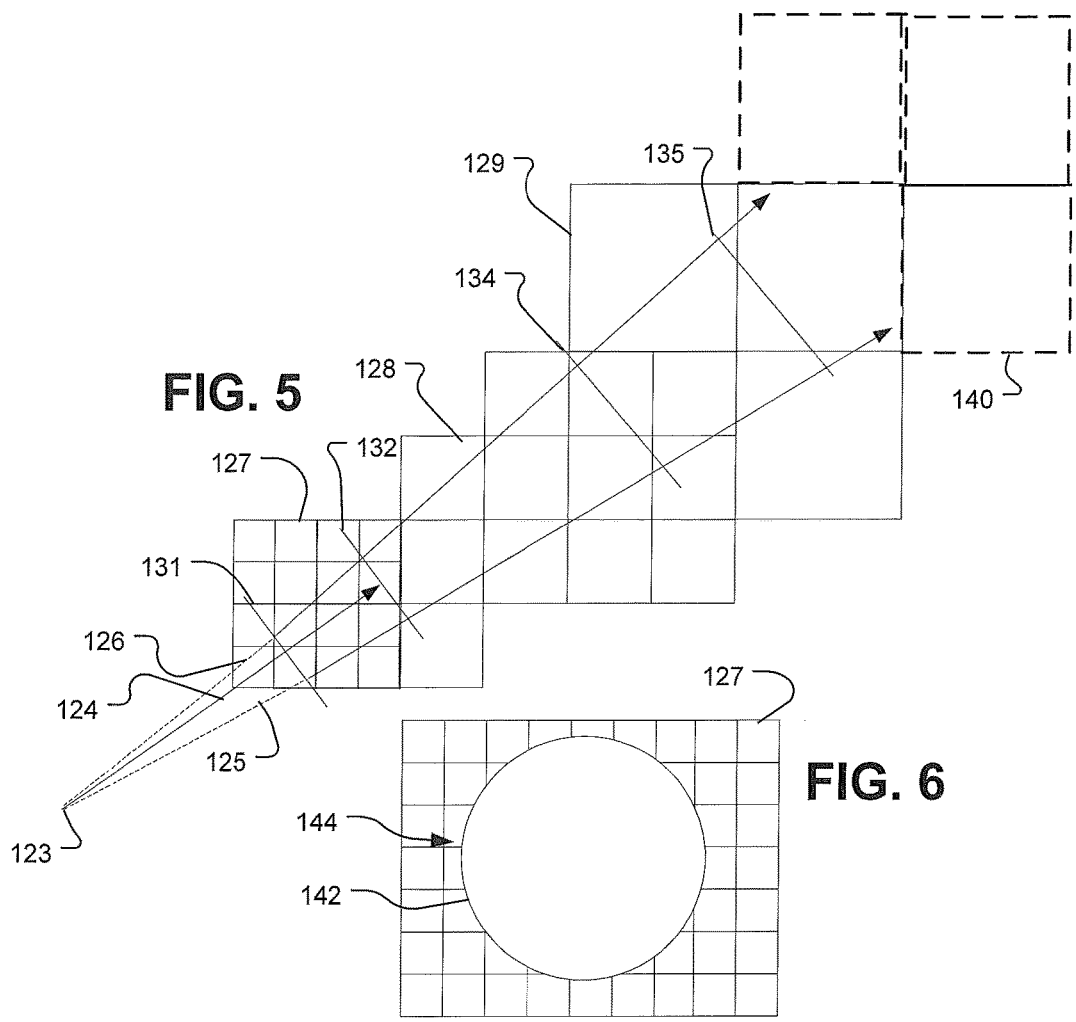
FIG. 5
FIG. 6
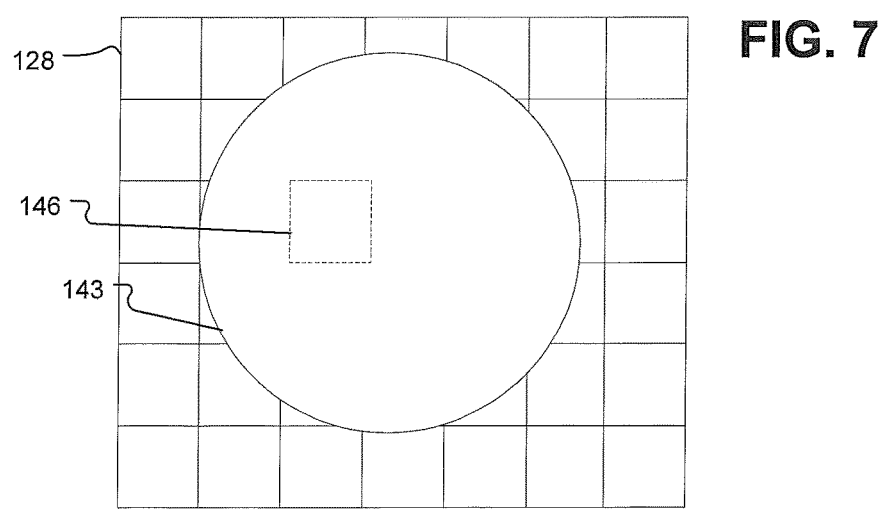
FIG. 7

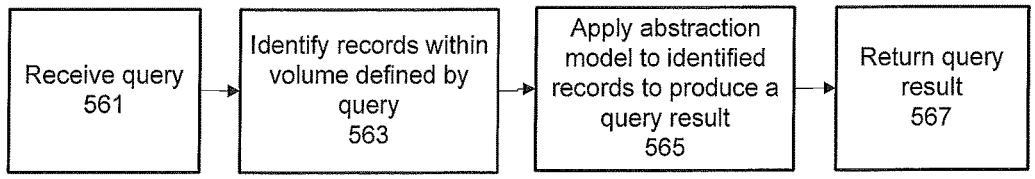
FIG. 20
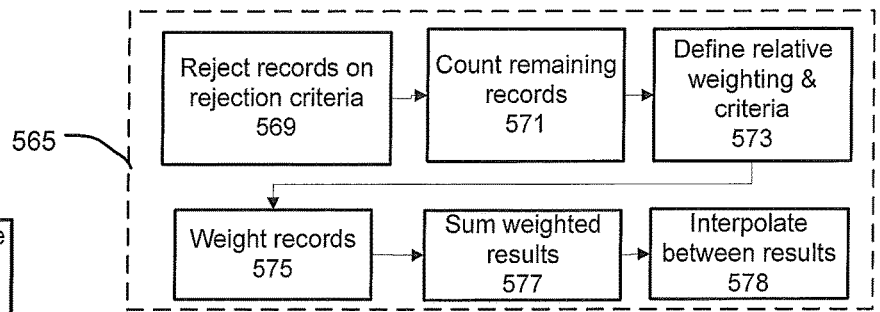
FIG. 21
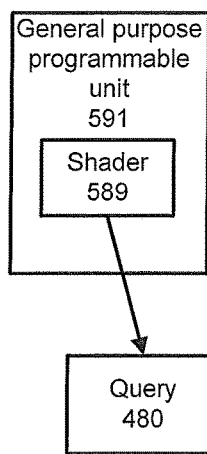
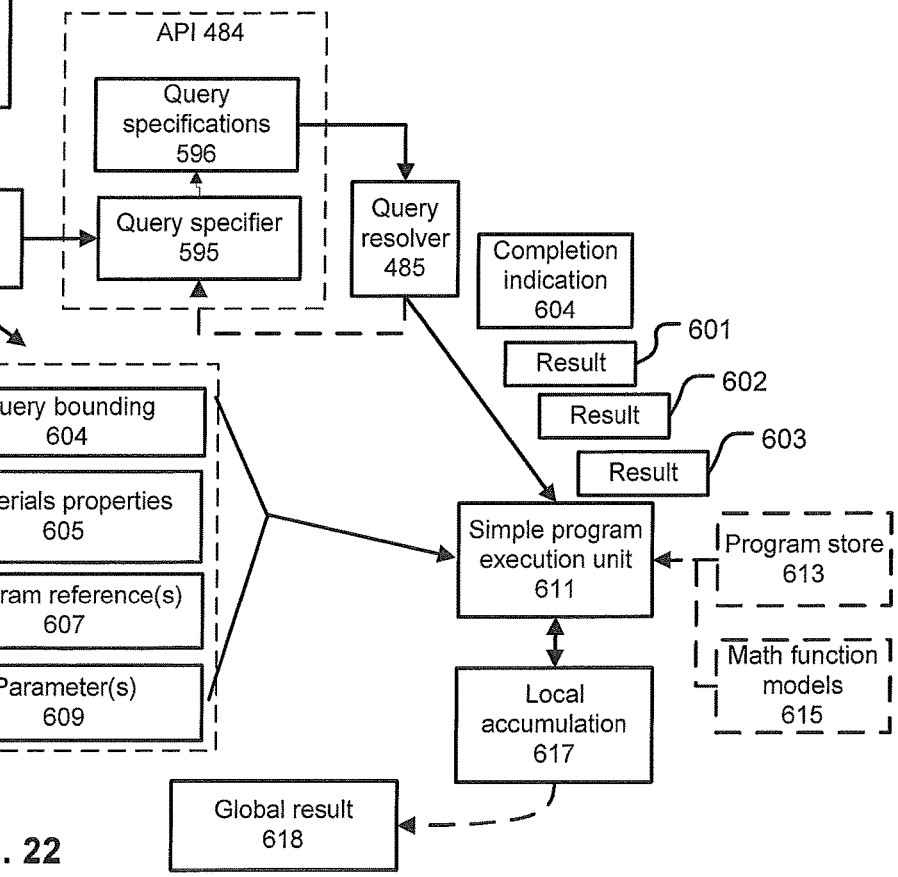
FIG. 22

QUERY RESOLVER FOR GLOBAL ILLUMINATION OF 3-D RENDERING

CROSS REFERENCE TO RELATED APPLICATIONS

This application is a continuation of U.S. application Ser. No. 14/203,094 filed Mar. 10, 2014, which claims priority from U.S. Provisional Patent Application 61/787,700, filed on Mar. 15, 2013, which applications are incorporated by reference herein for all purposes.

BACKGROUND

Field

The following relates to rendering from virtual 3-D scenes.

Related Art

Rendering images from 3-D scenes using ray tracing is based on evaluating a rendering equation, which includes a number of nested integrals that model different light behaviors, and is difficult to solve analytically. Therefore, non-analytical approaches to evaluating these equations can be used. One successful set of approaches to approximating the rendering equation is to use sampling techniques. The integral is evaluated at a number of discrete values, which can be determined randomly, to produce a probabilistic estimate of the integral from the samples.

SUMMARY

In one aspect, a hybrid rendering system uses ray tracing and sampling of light transport data volumetrically dispersed in a 3-D space. For example, a method for use in rendering from a virtual 3-D scene comprises tracing a ray, in a direction, from a point in a 3-D scene up to a maximum distance of a transition zone. If no intersection was detected for the ray closer than a minimum distance of the transition zone, then the method marches a conic section through a 3-D grid of volume elements in the 3-D scene along the direction of the ray. Each volume element is associated with data representative of light energy propagating through surfaces of that volume element. An area of the conic section being marched is determined based on a spreading factor and a distance from the point in the 3-D scene to a current sampling point. Light energy data is collected from the volume elements intersected by the conic section during the marching and lighting information is produced for the point in the 3-D scene from the collected light energy from the volume elements. In some aspects, methods can march a cone (which defines the conic section) for each emitted ray. Each cone can be axially centered along a direction of a respective ray. The march of a cone can begin at a minimum distance from a ray origin, and which minimum distance can be determined according to characteristics of the ray.

Data describing light energy propagation is accessed during the cone march. Such data may express direction and intensity data associated with light energy propagating from a respective volume element. Such light energy can include light originating from the volume element and light propagating through the volume element (and which can be modified according to characteristics of objects contained in such volume element). For example, each 3D grid element can be a cube, and each face of the cube can have light direction and intensity data associated therewith. Each cube of a given grid encompasses a volume that is encompassed in one or more larger grid elements (except for the largest elements). More granular elements represent smaller volumes in the 3-D scene and more precisely represent light directional and color intensity data, because less granular elements comprise a blending of the directional and color intensity data of a plurality of more granular elements. The light transport data can be created by forward tracing one or more rays from each light source and depositing discretized light energy records in the 3-D scene according to results of the forward tracing. For example, forward tracing may detect intersections between geometry in the 3-D scene and the forward-traced rays, which can result in deposition of a light energy record having characteristics determined according to characteristics of that surface. After depositing these light energy records in the scene, these records can be processed according to a specific format or formats in which that data would be expressed. These light energy records also can be used for multiple purposes, including providing photon maps for use in photon queries.

BRIEF DESCRIPTION OF THE DRAWINGS

FIGS. 2-3 depict aspects of using grids of volume elements to locate light energy characterization information in 3-D space;

FIGS. 5-7 depict 2-D views of an example of hybrid ray tracing and cone marching within grids of volume elements;

FIG. 20 depicts aspects of an example process of abstracting data from records deemed responsive to a query;

FIG. 21 depicts an example of an abstraction process; and

FIG. 22 depicts an example data flow within systems that perform query resolution and data abstraction according to the disclosure.

DETAILED DESCRIPTION

Figure 1:
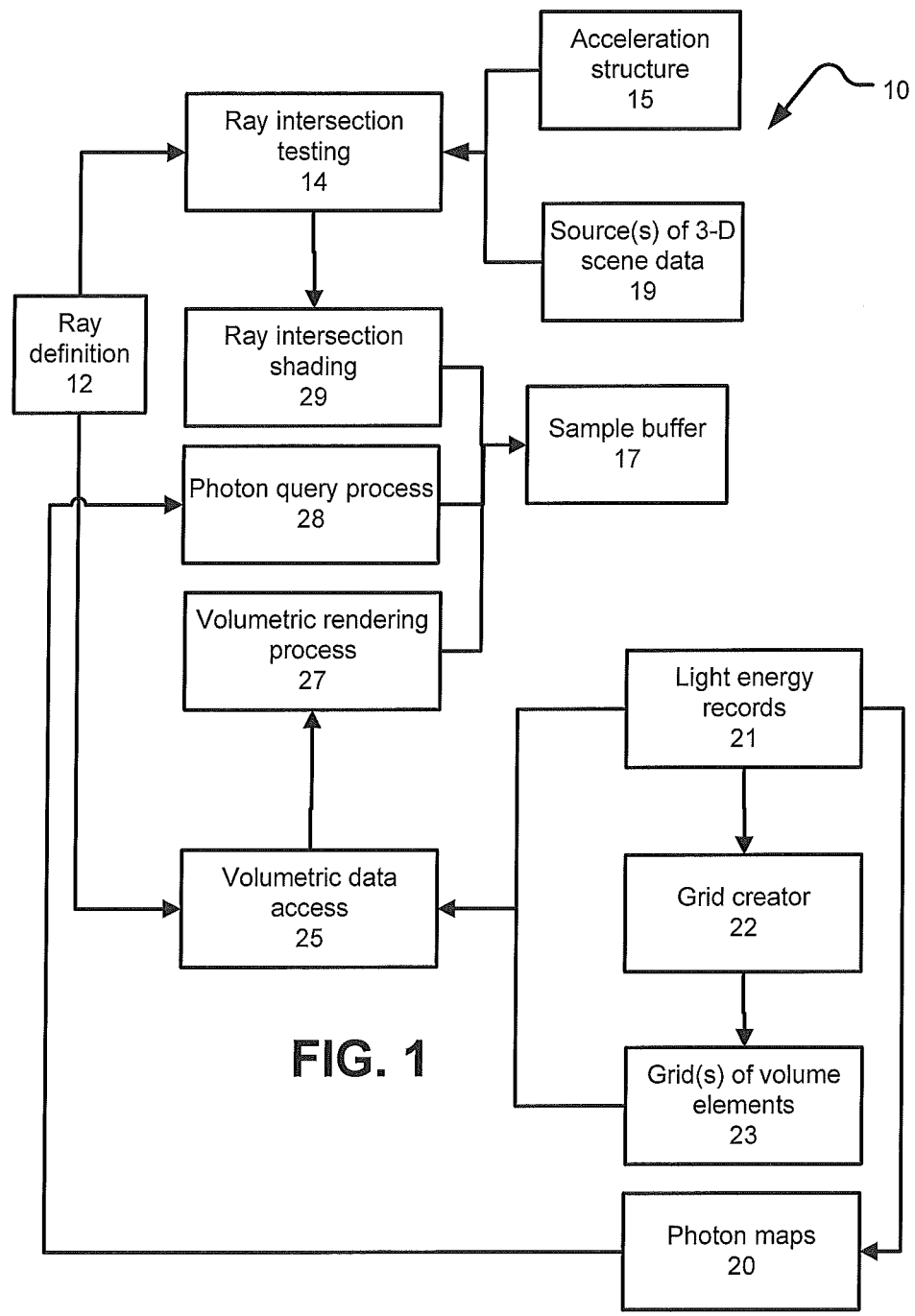
FIG. 1 depicts components of a hybrid rendering system that uses ray tracing and volume rendering inputs.

Ray tracing can produce vivid and detailed images from 3-D scene definitions, and can be used to model complicated light behavior and effects. Ray tracing is used here as a sampling technique for sampling or developing light transport data for parts of a 3-D scene that are relatively close to a point for which shading information is to be obtained. Here, when a sample comes from a point relatively close to a ray origin, it will be less noisy than a sample obtained from a point farther from the ray origin, because a volume of space where the sample is obtained grows as the distance from the origin grows. The ray sampling may be conducted at a relatively low density of sampling (such as a sampling density that would produce a noisy image, if the samples were of portions of the 3-D scene relatively far from the origin of the rays. Keeping the sampling density relatively low allows lower computation cost for ray tracing.

In conjunction with this ray tracing approach, a sampling of discretized light transport records (explained below) associated with sub-portions of the 3-D scene farther from the ray origin is conducted (e.g., outside of a maximum distance to which the ray(s) were traced). Results of one or more of shading induced by ray intersection(s) and data from the light transport records can both be used to arrive at a final shading result.

In more detail, ray tracing involves identifying an intersection between a ray traveling in the 3-D scene and a surface. Then, that surface can be shaded to produce the point sample that will be used to determine characteristics of a surface from which the ray was emitted. Identifying an intersection for a ray can be a computationally expensive operation. To make intersection testing more computationally efficient, a geometry acceleration structure can be provided that has elements bounding portions of the surfaces (which can be formed of primitives) in the 3-D scene. For example, a geometry acceleration structure may comprise a hierarchical tree of axis-aligned bounding boxes that terminate in leaf nodes, which collectively bound all the primitives forming surfaces in the 3-D scene. The geometry acceleration structure is used to identify a smaller set of surfaces that could be intersected by the ray; so, a ray is first traversed through the acceleration structure, and then is tested for intersection with any surfaces that remain candidates for being intersected by that ray.

An approach that provides for pre-computation of light transport information within pre-determined volumes of space in a 3-D scene can be used to characterize light transit information in different portions of such 3-D scene. During rendering, it may be desired to determine characteristics of light energy arriving at a given point in the 3-D scene, and the pre-computed light transport information can be used. A grid of volume elements can provide a way to associate particular light information with particular parts of a 3-D scene, as explained below.

An example of a grid of volume elements is a set of "packed" volumes, typically of uniform shape, that fill a 3-D scene. For example, a set of cubes of a given dimensionality can be packed to fill the 3-D scene. In some circumstances, multiple grids of volume elements can be defined to fill the 3-D scene multiple times. For example, a plurality of grids of volume elements, each respectively having a set of cubes of a given dimension, can be used to fill the scene. Functionally, this means that a larger cube of one grid will have contained therein multiple cubes of smaller size of a different grid (e.g., if an element is divided along each dimension, then 8 constituent elements would result). However, the grids of volume elements are not traversed by following a link or path from a larger volume element to a smaller. Rather, the volume elements are accessed during a march from one point (e.g., an origin of the ray) in a direction through the 3-D scene, and data from volume elements intersected during the march is accessed. Where multiple differently-sized grids populate the 3-D scene, a selection can be made of a particular size of volume element to sample at each location in the 3-D scene at which sampling is to be conducted. A march can be conducted by testing a defined shape (e.g, a cone) for overlap with a sequence of volume elements. The volume elements can overlap, such as where a size of the volume elements tested changes.

As an example, a set of volume elements can be produced, ranging from small elements to larger elements that include smaller elements. Each volume element can be a 6-sided regular shape (e.g., a cube). Each face of the shape can parameterize light that is traveling through that face. A volume element that includes other volume elements will be associated with data that represents a blending of the light transport information for each included volume element. Thus, each volume element can use the same amount of data to represent light transport information, resulting in light transport information for a given volume of space being available at various degrees of specificity. Stated otherwise, a multi-sized set of nested volume elements, such as close packed cubic elements located in 3-D scene space (and in contrast to a sparse tree of volume elements positioned and sized to bound scene geometry) can be produced, wherein each volume element includes a characterization of the light emitted from each of the faces of that volume element. A larger volume element represents the light emission from each of the multiple smaller volume elements located in it, but with less precision.

After creation of volume elements, they can be used for rendering by intersecting a conic section from a camera or a surface in the 3-D scene, and collecting the light emission encountered from all the volume element faces encountered on the path of the conic section. Closer to the origin of the cone (of which conic sections are taken at each sampling location), smaller volume elements are accessed and the light emission information is used, while farther from the origin, larger volume elements are accessed. One characteristic of sampling such volume element(s) is that each further level in the volume element structure can require eight times more memory (where each dimension is equally subdivided in a grid that is homogenous for different dimensions). Therefore, not only is the absolute memory size required to store the volume element set increased, but also the memory bandwidth required during rendering would increase, since sampling more small volume elements requires more memory bandwidth than sampling fewer large volume elements (holding constant an amount of data used to represent the relevant lighting information). Thus, having more layers in the hierarchy will yield more accurate results, but incurs a high memory cost. A cone here refers to a shape enclosing a volume, and which has an increasing cross-section area in a direction perpendicular to a longitudinal axis of the shape, as the shape becomes increasingly elongated on that axis. In some cases, the conic section may be symmetrical around such axis. Here, a conic section (a cross section of the volume) does not imply that the such cross-section have any particular shape. For example, the cross-section can be circular, an oval, rectangular, and so on.

In the following disclosures, examples of using both point sampling and volume sampling techniques (e.g., ray tracing and volume element sampling) in order to determine lighting information at a location in a 3-D scene are disclosed. In summary of the following, point sampling is undertaken for one or more samples that are limited to within a threshold distance of the point. For example, rays can be traced to determine an intersection, if any, within a threshold distance of the point. Outside of that threshold distance, volume sampling can be performed. In an example, volume sampling is undertaken by marching a conic section through a grid of volume elements. Sizes of the volume elements sampled can be determined according to distance from the point. Such sizes also can be selected according to a spreading factor associated with the cone, where the spreading factor indicates how quickly the cone spreads as a function of distance.

FIG. 1 depicts functional elements of a hybrid ray tracing system 10. System 10 includes a source of ray definition data 12, which provides an input to a ray intersection testing module 14. Ray intersection testing module 14 also has as input an acceleration structure 15 and source(s) of 3-D scene data 19. Ray intersection testing 14 communicates intersection testing results to a ray intersection shading module 29. Ray intersection shading 29 outputs shading results to a sample buffer 17.

A volumetric rendering process 27 receives light transport information obtained from volumetric elements by a volumetric data access module 25. Volumetric data access module 25 can receive inputs from one or more of a photon structure 21 and from a volume grid storage 23, which contains light transport data, as described in more detail below. A grid creator 22 is operable to produce the grids of volume elements that are stored in and provided from grids 23. FIG. 1 also depicts that a photon query process 28 can be provided to query photon maps stored as photon maps 20. Photon maps 20 can be produced in conjunction with production of the grids of volume elements 23, as a further product of processing preformed with light energy records 21. Volumetric rendering process 27 can serve as a controller for volumetric sampling tasks and control which volume elements are to be sampled and also process results received from such sampling.

FIG. 2 depicts a grid of volume elements 40, with one of the volume elements 41 is specifically identified. FIG. 3 depicts a grid of volume elements 43, which have smaller and denser volume elements than grid 40. Since the grid 43 contains smaller elements than grid 40, a number of elements in grid 43 can exist within one element of grid 40. FIGS. 2 and 3 do not imply that the volume elements of grids 41 and 43 are hierarchical, or that there is a relationship between volume element 41 and volume elements that occupy portions of volume element 41, (e.g., there is not an implication that the grids are traversed from a larger to a smaller element, within a volume encompassed by the larger element, as may be the case with a hierarchical acceleration structure).

In FIG. 3, volume elements 50-52 are specifically identified. Volume elements are associated with light transport characterization data. Light transport characterization data for a given volume element characterizes transport of light energy from that element; such light energy may be generated in that volume element, or may originate from outside that element. In one implementation, each volume element can be associated with record(s) of energy radiating from surfaces within that volume element. Such radiating energy can be characterized based on forward tracing from emissive sources.

As an example, such data can represent light transport through specific faces of the volume elements. For clarity of description, FIG. 3 shows that element 50 has a face 90, which is associated with a light transport characterization 82. Light transport characterization 82 can include information about light being emitted from inside element 50 to an exterior of element 50. Light transport characterization 82 also can include information both about light traveling into element 50 through face 90, and vice versa. A similar light transport characterization 83 is identified for face 91 of element 51. Light transport characterizations 84 and 85 are shown for other faces of element 51. In one example, light transport characterization 81 is a less granular characterization of light transport. Such light transport characterizations 81-85 may include information about light directionality, color and intensity of light. The data can include one or more directions and quantification of light energy traveling in each of those directions. A light transport characterization can characterize light traveling in only one direction (e.g., out of the volume), a range of directions, and bidirectional light transport. In other implementations, a statistical distribution or curve can be provided that defines a pattern or distribution of light energy over the surface of each face.

In an example, a distribution of light energy may be provided in which various parameters may be completed for each characterization, using the same distribution function. The pattern or distribution can be fitted according to the actual light energy being emitted. In some examples, a single type of pattern, which has one or more parameters that can be tuned for each face, and those parameters are then selected to match the actual distribution, to the extent possible. As explained, the association of light energy propagation through faces of the volume elements is an example, in that a variety of ways to express light transport within such a volume element are possible. In general, such light transport would be expressed in a manner that allows light transport, along a cone march, to be evaluated.

Volume element 41 in turn includes volume elements 43, of which 4 (of 8) are depicted in FIG. 3. FIG. 3 also depicts that geometry, such as primitives 45-46 and shape 47 are located within the same volume as occupied by volume elements 43, even though there may not be a logical linkage or connection that identifies which of such geometry is within a given volume element.

Each set of volume elements, in an example, have an even distribution in the 3-D scene, because the volume elements of that set are arranged in a regular, non-sparse structure. Many kinds of data structures used in ray tracing are irregular, and are designed to reduce storage space required to represent the data structure. In one aspect, the volume elements in each set are in pre-determined respective locations, and each is associated with ("contains") data representing light energy within the bounds of that volume. By contrast, an acceleration structure for abstracting geometry for use in testing rays for intersection in the 3-D scene has volume elements that are located and sized according to the geometry in the scene.

Forward tracing light energy from lights into the 3-D scene can be used to determine light energy that will be represented in each volume element. Forward tracing may involve tracing rays from each light source, and for each place where the ray intersects, data representing light energy will be deposited. Such deposition is additive in that the 3-D scene will become brighter as more light energy is deposited. Such forward tracing has some similarities to photon mapping, in that photon mapping also involves forward tracing from lights. However, photon mapping provides a norming operation that maintains a total amount of light energy in the scene constant as photons are deposited. The norming operation results in surfaces having a number of photons that correlate to a relative complexity of how light interacts with that surface. For example, a flat painted wall may have only a few photons deposited, while a facet of a glass surface may have many more. In some approaches herein, the finest grid of volume elements (e.g., the grid with the smallest elements) may have on the order of $2^1\backslash24$ elements, which can be expressed as 8 levels below a root. If a grid of volume elements were to be used without using ray tracing, a finest grid may require on the order of $2^1\backslash40$ elements, or on the order of 32000 times more grid elements in the most granular level of the grid structure. These examples are non-limiting, and qualitative.

Figure 4:
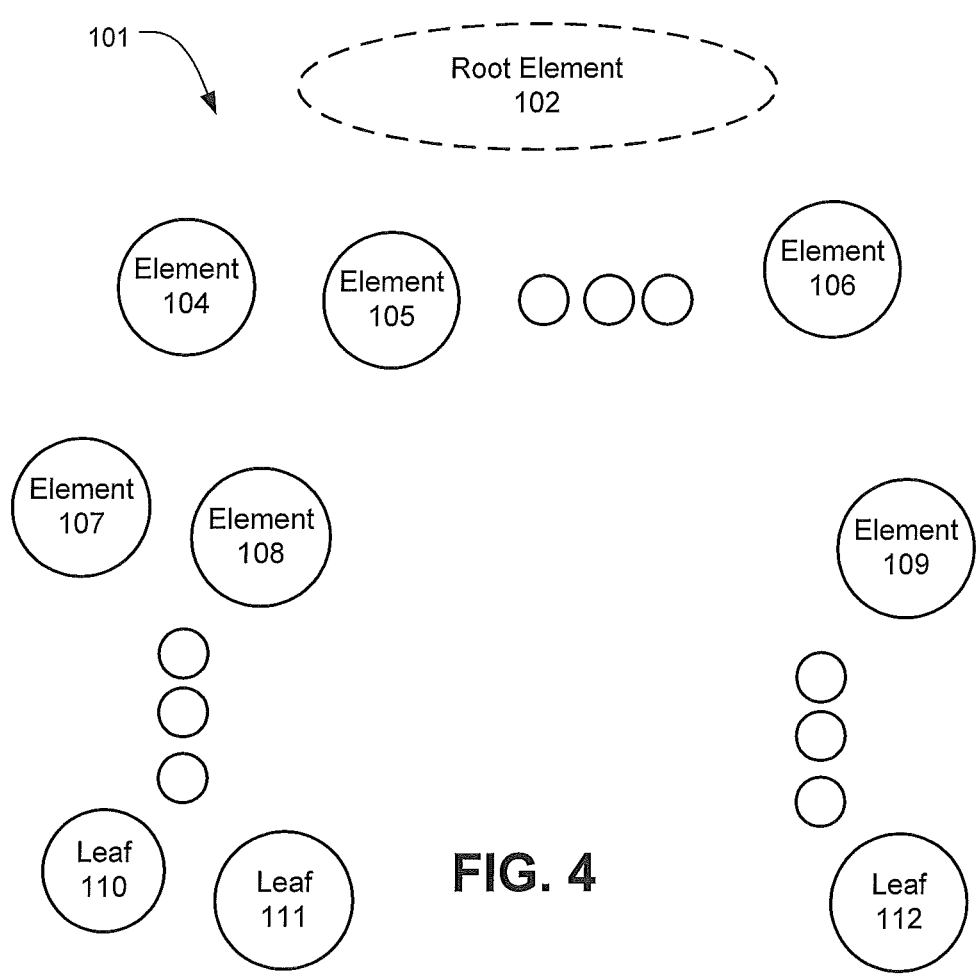
FIG. 4 depicts a geometry acceleration structure that can be used in tracing rays in a 3-D scene.

FIG. 4 depicts an example geometry acceleration structure 101, which can be represented by data stored in acceleration structure storage 15. Geometry acceleration structure 101 includes a root element 102 that is associated with child elements 104-106. Each child element 104-107 can in turn be related to child elements 107-109. This chain of relationships may continue until reaching a set of leaf nodes 110-112. In some implementations, each element bounds a portion of 3-D space, in which one or more elements of geometry exist. In some implementations, geometry acceleration structure 101 is sparse, such that areas of a 3-D scene that do not contain geometry have no geometry acceleration structure elements. Additionally, each acceleration structure element (except the root) is related to one or more parent elements, and one or more child elements. Multiple child elements may relate to the same parent, and multiple parents may also relate to a single child element. As an example, a parent node bounds a given sub-portion of space, in which certain portions of geometry reside, and child nodes bound selections of the geometry in that parent node. Geometry acceleration structures may have branches with different numbers of nodes between root and each leaf, may not have an explicitly defined root, may have all primitives bounded by nodes that bound only primitives, or which bound other nodes. As such, FIG. 4 is exemplary and not limiting as to an implementation of a geometry acceleration structure.

For example, an acceleration structure for bounding scene geometry can include a tree of axis aligned bounding boxes (a tree here meaning that there is a relationship between elements that can be followed to traverse from a starting point in the tree to another point). For example, a tree of axis aligned bounding boxes can be hierarchical, and have all geometry bounded by leaf nodes of the hierarchy. Other examples of acceleration structures include K-D trees and sphere hierarchies. Functionally, a hierarchical acceleration structure can be traversed by starting at a root node, which can bound all scene geometry (the root node can be implied, as an extent of the entire 3-D scene), and then finding all children of the root, testing them for intersection, and then continuing to traverse the branches of all child nodes that were intersected by a ray, following the same pattern. Thus, in traversing an acceleration structure for geometry, a ray can be tested for intersection in a plurality of different parts of the 3-D scene concurrently. Ray intersection testing module 14 also accesses 3-D scene data from the source of 3-D scene data 19 (FIG. 1). Such 3-D scene data can include primitives composing objects in the 3-D scene, and in an example, are accessed when a leaf node is intersected, so that the geometry in that leaf node is to be tested for intersection.

Geometry acceleration structure 101 is used by ray intersection testing module 14 to remove sub-sets of scene geometry from having to be explicitly tested for intersection. For leaf nodes that are found to be intersected by a given ray, geometry residing in those leaf nodes is tested for intersection with that ray, and information for a closest intersection can be sent to ray intersection shading module 29. Once an intersected surface is found, a shader can be run to determine what effect that surface will have on a rendering being produced. A shader can, for example, emit a reflection ray, and can also emit rays that are directed to light sources, in order to determine what light is hitting that intersected surface.

Figure 9:
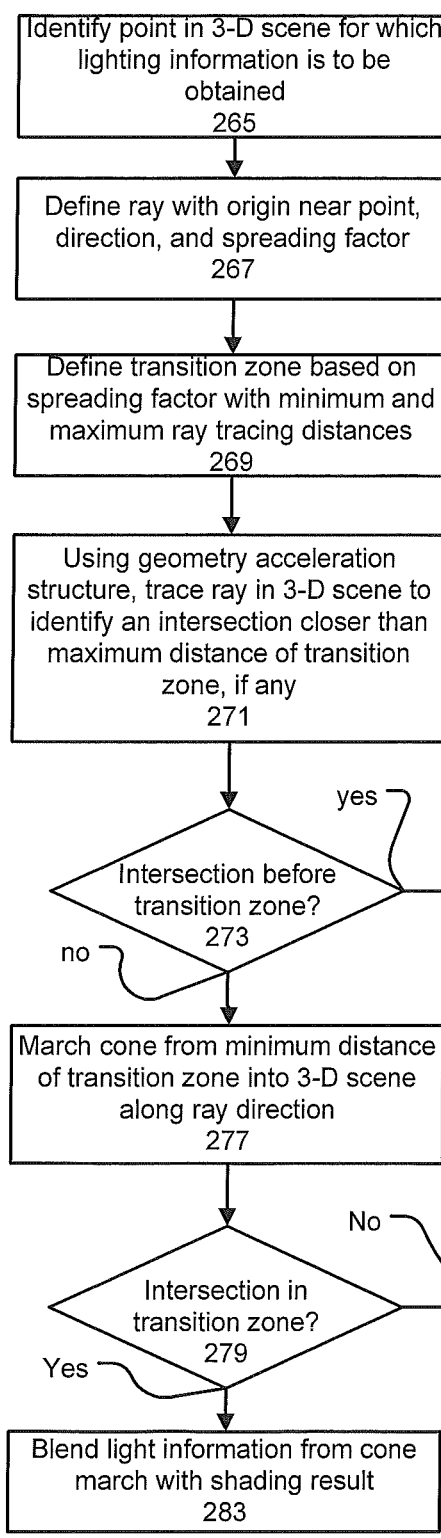
FIGS. 9-10 depict example approaches hybrid ray tracing and volumetric light energy estimation, for determining shading information for points in a 3-D scene or pixels of a rendering being produced, for example.

FIG. 9 depicts an example process of producing lighting information for a point in a 3-D scene according to the disclosure. FIGS. 5-7 are used in explaining aspects of the process of FIG. 9 (FIGS. 5-7 depict 2-D illustrations, instead of a 3-D model, for simplicity). In FIG. 9, at 265, a point (FIG. 5, 123) is identified as a location for which lighting information is to be obtained. The location can be a point on a surface of an object in a scene, or a sample of a pixel in a rendering, for example. At 267, a ray (ray 124 of FIG. 5) is defined to be emitted from proximate the point, in a direction, and is associated with a spreading factor. In FIG. 5, an expression of the spreading factor is depicted (in 2-D) as a cone defined by boundaries 125 and 126 that bracket ray 124. At 269, a transition zone is defined and includes maximum and minimum ray tracing distances (minimum distance 131 and maximum distance 132 of FIG. 5). In one example, the transition zone is defined based on the spreading factor. In one example, a wide spreading factor results in a transition zone closer to origin 123.

At 271, using a geometry acceleration structure, rays are traced in the 3-D scene to identify an intersection within the maximum distance 132 of the transition zone, if any. In FIG. 5, ray 124 is traced (FIG. 9, 271) from origin 123 to maximum distance 131, attempting to identify a closest intersection for the ray and surface geometry, as explained above. At 273, if there is an intersection before the transition zone (closer than minimum distance 131 in FIG. 5), then, at 275, results of shading that intersection are used to determine lighting information.

At 277, beginning from minimum distance 131, a cone march begins. Ray tracing continues through the transition zone, and at 279, if there is no ray intersection within the transition zone, at 281, results of the cone march will be used for producing lighting information for the point. At 279, if there is a ray intersection in the transition zone, then at 283, results of the cone march are blended with a result of shading induced from or caused by the ray intersection (e.g., a shading output).

Now, FIG. 5 is used to explain further aspects of the cone march introduced in FIG. 9. The cone march includes that a conic section defined by boundaries 125 and 126 is projected from point 123 into space (in 2-D, the conic section becomes a line that is moved within the 2-D plan.) FIG. 5 depicts that a grid of volume elements, which each have a relatively small volume compared with volume elements of other grids, are selected for sampling comparatively close to point 123. Light characterization information for each volume element intersected by the conic section is accumulated (here, the example assumes light characterization information is associated with faces of the volume elements, which is an example implementation). Such accumulation can include tracking an amount of light energy accumulated within various frequency spectra and also accumulate an opacity value associated with each intersected surface. The opacity value can be derived from characteristics of what lies in the interior of that volume element. The opacity value can be used to decide when to terminate the cone march. For example, a black wall would absorb light energy and be opaque, so the cone march can be stopped based on sampling the light characterization data of a volume element that specifies these properties.

FIG. 5 also depicts that where the grid of volume elements being sampled increases in size, that a transition zone can be provided where volume elements of both sizes are sampled. By particular example, when switching between a grid of volume elements having a size according to volume element 128, to a grid having volume elements of a size exemplified by volume element 129, a transition zone is demarcated between 134 and 135. Volume elements outlined in dashed form (e.g., 140) depict that an accumulated opacity value has been found to make further cone marching unnecessary. A decision criteria as to when a march can be stopped can vary with the application.

FIG. 6 depicts a cross-section 142 of the conic projection discussed with respect to FIG. 5. In FIG. 6, the volume elements are of size like that of volume element 127. FIG. 6 thus depicts that some volume elements are entirely within the area of cross-section 142. Some volume elements are only partially within cross-section 142 (e.g., area 144). For those volume elements, a weighted combination of the light characterization information can be combined with that of the other light characterization information. FIG. 7 depicts similarly that the volume elements increase in size (e.g., now the volume elements are sized like that of volume element 128), but the cross-section 143 of the conic section also has grown. FIG. 7 also depicts that in practice, some volume elements will drop out of the cone march before other elements; and in particular, element 146 is not participating in the cone march, but surrounding elements are. FIGS. 6 and 7 also serve to illustrate that a number of volume elements will be sampled during the cone march and the light characterization information can be blended to arrive at a result that can be used in shading point 123, or for other processing as appropriate.

Figure 10:
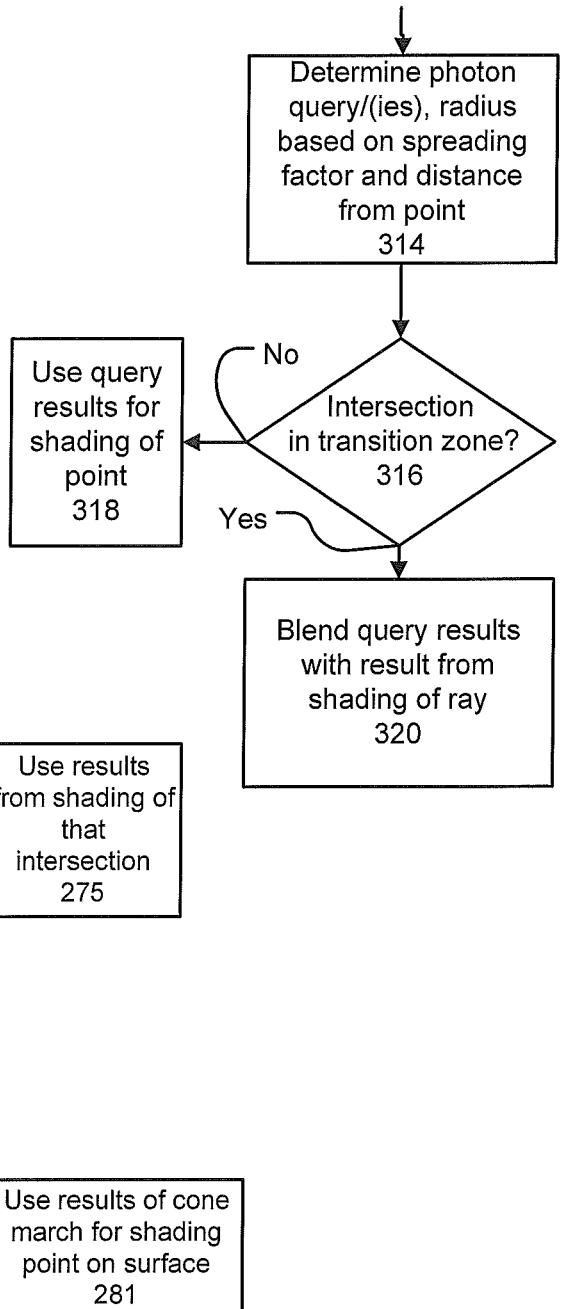

FIG. 10 depicts a substitution to a portion of the process of FIG. 9. Rather than perform a cone march (277 in FIG. 9) through one or more pre-defined grids of volume elements, a set of queries can be assembled, to be made of discretized light energy records. These queries can be generated for different regions of space that enclose volumes of space along a path of a conic projection through the scene along a path of the ray. In p articular, FIG. 10 depicts, at 314, that a set of queries can be determined. In an example, queries can have a spherical extent where radii of the queries can be determined based on the spreading factor of the ray and a distance from point 123 (FIG. 5). A size of the volume queried would increase as a distance of the query increases from point 123.

In one approach, different maps or data structures containing discretized light records can be provided for use in such queries. Each map or data structure can have a different level of abstraction of light energy data. For example, a coarse map may contain discretized light energy records that each represents a blending of a plurality of such discretized light energy records. A map or data structure of an appropriate granularity can be selected to satisfy each query. Thus, a query with a large volume does not necessarily return more records, but rather can be used to query a data structure having light energy records that each represent a blending of more granular records (which may in turn be queried using a different data structure). In such an approach, it may be appropriate to provide a single data structure that can be used for each query, but records at an appropriate level of granularity are selected to satisfy a given query. The appropriate level can be determined based on a variety of factors, including the volume or size of the query, which can be correlated to a distance from a point for which light energy information is being gathered.

Thus, discretized light energy records can begin as a description of light energy at a point in space, but upon blending with other records, or abstraction to a volumetric element, a resulting light energy record can be generated for a determined volume. Such generation can be done in advance or done on demand. In one approach, where such generation is done on demand, results of such generation can be cached. In one example, common volumes for a plurality of marching processes (such as different cone marches) can be identified, and then light energy characterization data at an appropriate level of granularity (see FIGS. 4-5 as examples) can be generated. In one example, cones may be marches from different origins, but these all require light energy characterization data from the same portion of the 3-D scene at the same level of granularity (which can be determined by distance from respective origins, and respective spreading factors for example).

In another approach, queries can be formed from multiple overlapping volumes, and Boolean logic can be applied to determine a final query result. For example, spherical queries can be made to overlap to an extent, and only photons that exist in the overlapping portion can be returned. These techniques can be used to approximate querying light energy data associated with surfaces of a grid of volume elements (see FIG. 3). As in FIG. 9, where there is no ray intersection detected in the transition zone, then at 318, photon query results are used to produce shading outputs for the point. If there was an intersection in the transition zone (and not before, see FIG. 9), then, at 320, photon query results are blended with results from shading the intersection.

Figure 11:
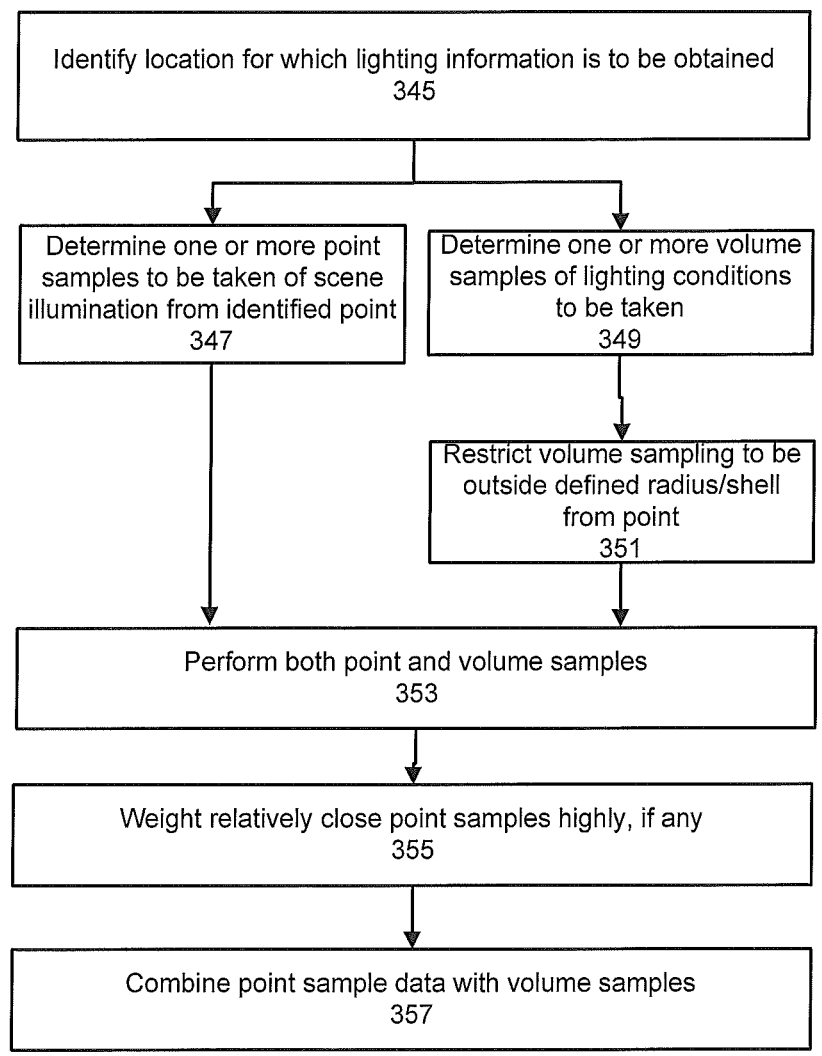
FIG. 11 depicts a further generalization of the more specific examples of FIGS. 9 and 10.

Following on the more specific examples disclosed above, FIG. 11 depicts a more general process that can be practiced in implementations of the disclosure. FIG. 11 depicts that, at 345, a location is identified for which lighting information is to be obtained. This location can be a point in the 3-D scene (e.g., a point on a surface of an object), or a sample being taken for a 2-D image being rendered, for example. Lighting information is used in the disclosure to include any kind of rendering information, and such lighting information would be expected to vary according to the type of rendering being produced. In order to produce such lighting information, at 347, one or more point samples are taken of illumination arriving at the location. At 349, one or more volume samples are determined for lighting conditions that may affect the location for which lighting information is to be obtained. At 351, a distance restriction on such volume sampling to a distance outside of a defined radius from the location is established, while conversely, the point samples can be confined within that radius. At 353, the point and volume samples are performed. At 355, results from relatively close point samples are weighted more highly than other samples obtained. At 357, results of point and volume sampling can be combined to produce the lighting information for the location. Thus, the process depicted in FIG. 11 is generic with respect to how the point samples and the volume samples may be taken. The point samples can be confined to a relatively close distance from the location, or otherwise weighted according to distance from the location, while the volume samples are accumulated over a volume swept through the 3-D scene, from the location. Attenuation or an extent of the 3D scene, for example, can govern a maximum distance at which volume sampling is conducted.

Figure 8:
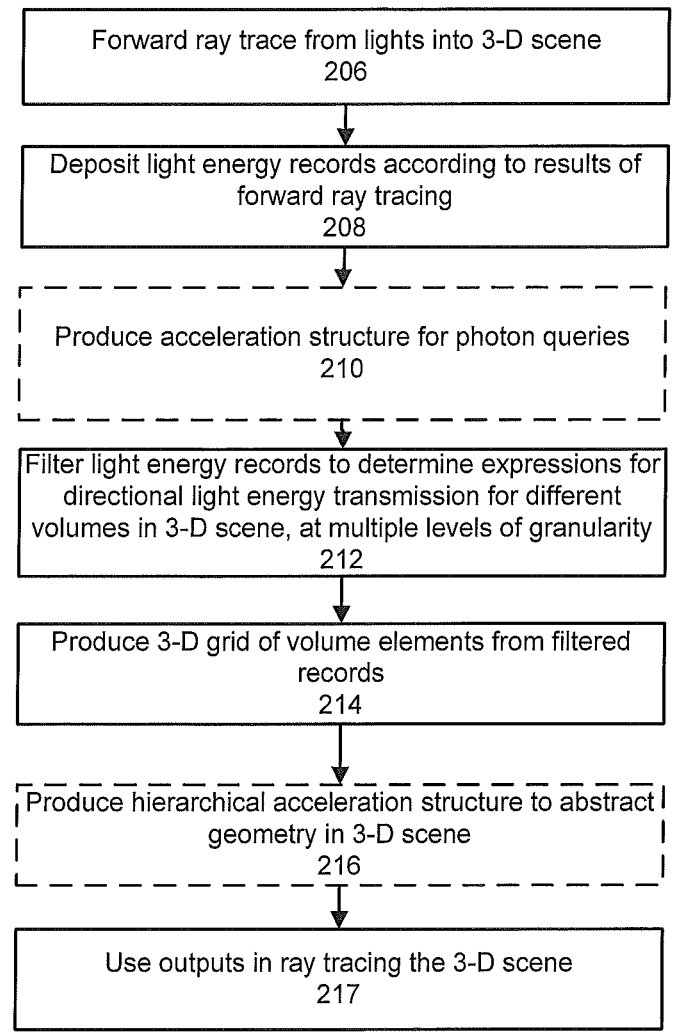
FIG. 8 depicts an example approach to producing grids of volume elements containing light energy characterization information.

The above disclosure related primarily to producing rendering outputs from specified data sources (e.g., shading of intersection results and gathering data from elements of one or more grids of volume elements.) FIG. 8 provides an overview of an example process for producing data sources used in producing the rendering outputs.

FIG. 8 depicts an example process 205 by which light transport data can be produced for use during rendering from a 3-D scene. FIG. 8 depicts that process 205 provides that, at 206, rays can be forward traced from lights into a 3-D scene. For example, a respective set of rays can be determined for each light, where a number of rays in each set can be determined according to an intensity or importance of that light. In one approach, the rays can be specified using Monte Carlo or Quasi Monte Carlo principles. Rays also can be specified based on known locations of objects in a 3-D scene. An artist also can directly specify rays or bundles of rays to be forward traced. This forward tracing establishes visibility of objects in the scene to each of the lights. Additionally, once visibility of each light is determined, further generations of rays can be forward traced according to characteristics of the respective surface intersected by each of the objects. At 208, discrete light energy records can be deposited at each intersected surface according to characteristics of that surface. For example, a diffuse surface can have a set of light energy records dispersed on the surface, while a shiny surface can have a specular reflection represented by more densely packed light energy records. Also, rays that are traced from a given surface also will be determined according to the nature of the surface. For example, rays can be traced from a specular surface according to Snell's law. A diffuse surface scatters light more and thus can result in shooting more rays going in variant directions, but can be traced for a shorter distance, in an example.

At 210, an acceleration structure for use in photon map queries can be produced based on the locations of the deposited light energy records, and an appropriate norming process. This acceleration structure can be separate from an acceleration structure for tracing rays in the scene and also different from the grids of volume elements. Portions or an entirety of these structures can be shared.

At 214, the grids of volume elements can be produced by aggregating the light energy data described by the records into respective volumes of the 3-D scene that are within different of the volume elements. In one approach, face-specific representations of light energy propagation can be produced from the aggregated data. At 216, an acceleration structure for ray tracing can be produced; this portion of the depicted process 205 may proceed according to conventional approaches. In some examples, however, volume grid elements being processed for producing the 3-D grid of volume elements (at 214) can be used as an input for producing elements of the acceleration structure. For example, a smallest volume element being processed can be processed for both light energy records and geometry, even though the ultimate constituent elements of the grids of volume elements and of the acceleration structure are different. In some implementations, one or more of these acceleration structures (for photon querying, for abstracting scene geometry, and the 3-D grids) can be shared or partially shared structures. For example, a set of axis aligned bounding boxes can abstract scene geometry, and closer to a root node, also serve as grid elements, while leaf nodes can be sparse.

Each of the above-described portions of process 205 is depicted serially. However, the process portions can proceed in parallel. For example, if working within a given volumetric portion of the 3-D scene, a part of multiple process portions (e.g., 210, 212, 214 and 216) can be performed, and then a different volumetric portion of the 3-D scene can be processed next. Additionally, a number of independent threads (or processing units) can be allocated for processing the different portions of the process, such that they may proceed concurrently.

Figure 12:
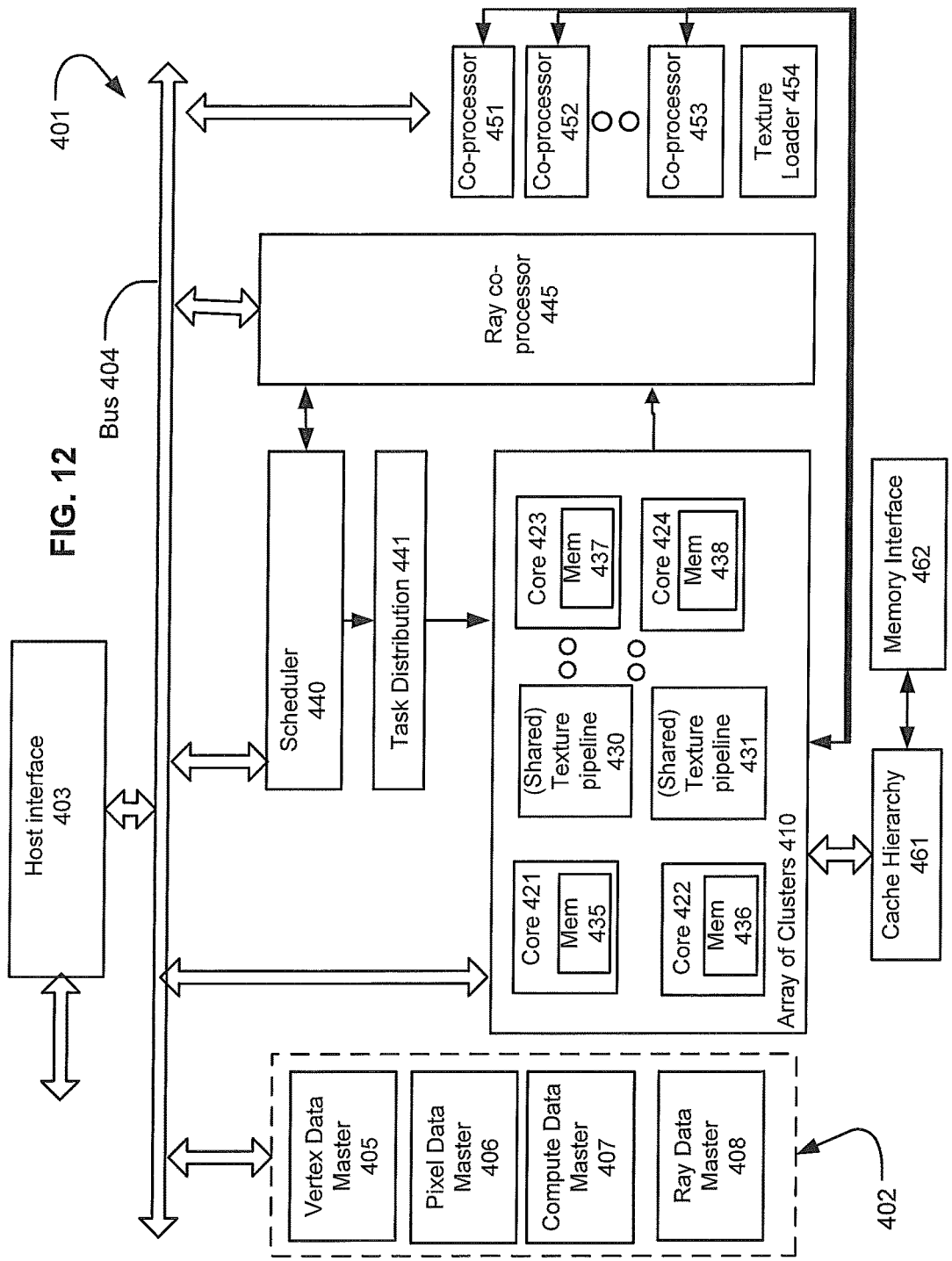
FIG. 12 depicts an example of a processing system in which disclosed aspects can be implemented.

FIG. 12 depicts an example system 401 comprising one or more of programmable elements and fixed function elements, in which aspects disclosed above can be implemented. System 401 comprises a host interface 403, which can provide an interface to a processor primarily devoted to execution of applications that may use system 401 for selected processing functionality, such as graphics processing. Such processor can be integrated within a system on chip. A bus 404 provides communication among various components described below. In some approaches, an application processor also can be connected to bus 404, and thus, host interface 403 is not a necessary component. A variety of data masters 402 can be used to setup computation to be performed on system 401. Such data masters 402 include a vertex data master 405, a pixel data master 406, a compute data master 407 and a ray data master 408. Vertex data master 405 can be used to setup geometry processing to be performed on an array of computation clusters 410. Pixel data master 406 can be used to setup pixel shading operations to be performed on the array 410. Compute data master 407 can be used to setup general purpose parallelized computation on array 410. Ray data master 408 can be used to setup ray tracing operations on array 410, such as ray intersection testing and ray shading operations.

Array 410 comprises a set of computation elements identified as cores 421-424. Each core 421-424 comprises a respective local memory 435-438. In one example, array 410 also may comprise shared texture pipelines 430 and 431. A scheduler 440 can arbitrate among jobs to be performed for each data master 405-408. A task distributer 441 communicates with scheduler 440 in order to distribute computation tasks to be performed on array 410. A ray co-processor 445 can be provided to assist in ray tracing computation. In one example, ray co-processor 445 comprises a collector function that collects rays to be processed into groups according to one or more grouping criteria. System 401 also can comprise a variety of other coprocessors 451-453 that can be special purpose hardware for different activities, such as audio processing or other digital signal processing. A texture loader 454 can be used to load texture information as an offload to texture pipelines 430-431. Array 410 also can communicate with a cache hierarchy 461 that may also couple with a system memory interface 462. Elements depicted in FIG. 1 can be implemented in system 401 by programming array 410, by using ray co-processor 445, using one or more co-processors, or a combination thereof. Depending on implementation different, fewer, or additional components may be provided in a system according to FIG. 12. For example, not all systems may implement geometry processing on the same physical computation resources as pixel shading or ray processing.

Array 410 can be programmed to perform processes or otherwise implement functions shown in FIG. 1. Fixed function circuitry can also be provided to perform such functions, or portions thereof. Various portions of system 401 can perform different portions of the processes and operations described herein. For example, vertex data master 405 can operate to obtain vertex data used in creation of an acceleration structure that abstracts scene geometry, and also during forward tracing to create discretized light data records. Array 410 can be programmed with shaders that are activated in response to ray intersections. Array 410 also can be programmed to perform the calculations for marching a conic section through the disclosed grids of volume elements and other tasks such as ray intersection testing, for example. Ray co-processor 445 can be provided to perform some specific tasks for ray operations. For example, ray co-processor 445 can operate to make collections of rays that are submitted to array 410 for processing concurrently, and operate to swap out ray processing tasks that begin to fail to fully use a computational bandwidth of array 410 or an independently schedulable portion thereof. Portions of array 410 can be performed to execute different tasks concurrently. For example, one portion of array 410 can be producing a portion of a grid for marching, while another portion is marching a conic section through a previously-produced portion of the grid.

Figure 13:
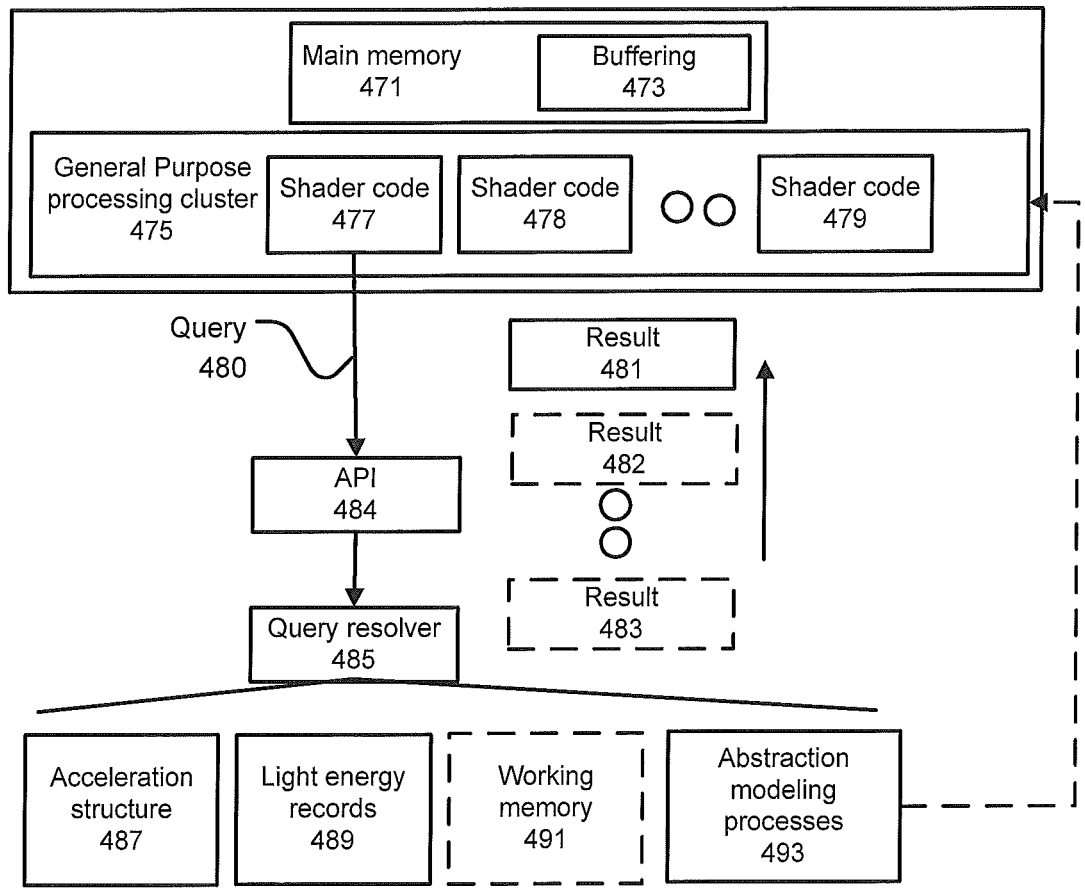
FIG. 13 depicts an example query resolver system.

FIG. 13 depicts aspects of an example system that can receive and respond to queries relating to discovering light energy records. Elements of the depicted system are introduced, before more detailed explanation is provided. A general purpose processing cluster 475 can execute shader code 477-479. Each of these portions of shader code can be instantiated or begin execution in response to an identified intersection between a ray and a surface, for example. General purpose processing cluster 475 can use a main memory 471 to store data during execution and can include buffering space 473 that can be used for purposes described below. As an example, shader code 477 issues a query 480 relating to discovery of light energy records, which will be served by a query resolver 485. This query can be received by an API 484 that provides one or more calls that specify criteria to be made in each such call. API 484 provides a uniform format to queries and can provide abstraction for underlying hardware that may have different capabilities in different implementations. In some implementations, API 484 may support a baseline type of query or queries, and in other implementations, extended query types or formats may be supported.

Query resolver 485 can read from acceleration structure 487 that can be implemented as a graph of a set of interconnected elements that abstract subsets of light energy records located in a 3-D scene. A subset of light energy records in light energy records 489 can be identified to be read. A working memory 491 can store intermediate results of photon queries. Descriptions of abstraction modeling processes 493 can be stored and used by query resolver 485 to produce one or more results for each of the queries it receives, such as query 480.

When executing shader code requests for light record information (e.g., emits a query to discover photons within a defined radius of a specified point), the shader code may have coded with some preliminary guess or heuristic as to how many photons may be returned in response to a given query. However, in a query that simply returns all records that meet a given specification, there is no apriori limitation on a number of records that are discovered and returned. So, shader code may reserve a buffer space (e.g., buffer 473) to receive records returned from a query. However, such buffer space reservation would need to be sized to a "worst-case" scenario, in which a large number of records were returned. Additionally, in a situation where memory is constrained, or where it is desirable to reduce data traffic (e.g., for power consumption), this approach may be undesirable. The following disclose provides a variety of example approaches to enabling shader code to have more predictable responses to such queries, to enable serving of a wider variety of queries and to accelerate the computation of useful responses to such queries. These queries also can be used to produce pre-computed light transport data for use in techniques and systems disclosed above. Queries according to the disclosure also can be used to query and return such pre-computed light transport data.

Figure 14:
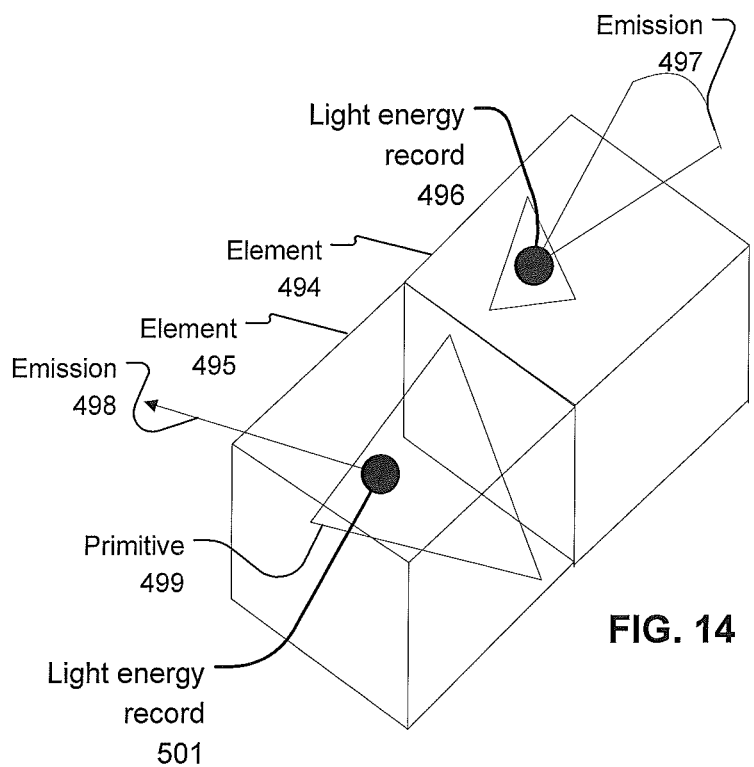
FIG. 14 depicts light energy records located in volume elements.

FIG. 14 depicts an example of light energy records located within defined volume elements of a 3-D space. These light energy records can be discovered and processed by query resolver 485. FIG. 14 depicts that light energy records can contain a variety of different information. The information in the light energy records can be used in conjunction with different kinds of query definitions or other processing approaches to produce an ultimate result to a given query. Examples of light energy records include light energy records 496 and 501. Light energy record 496 includes data defining an emission 497 that has a directionally-specific distribution of light energy. Emission 497 can be represented as a parameterized distribution, such as by supplying coefficients for a selectable directionally-specific weighting function. Emission 498 of lighting energy record 501 shows a simpler example of a direction and intensity vector.

Figure 15A:
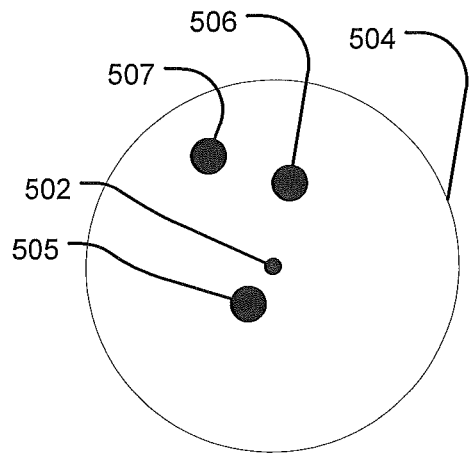
FIGS. 15A and 15B depict aspects of an approach to determining a set of records responsive to a nearest-neighbor query.

FIG. 15A depicts an example situation in which a query for light energy records within a radius 504 of a query locus 502. In FIG. 15A, records 505-507 are located within radius 504. Query resolver 485 may search within an acceleration structure for one or more elements that bound the volume of space enclosed by the query. There may be multiple such elements that collectively bound the volume. Query resolver 485 may search for these elements of the acceleration structure and identify the appropriate records in any order (i.e., there is no guarantee that query resolver 485 identifies records in a known order, such as ordering by increasing distance from origin 502. Also, a number of records located in the volume of the query would be unknown initially.

However, some kinds of queries may benefit from or require a selected relative ordering or sorting among records. For example, a query may ask for a specified or maximum number of nearest records to a locus ("k-nearest-neighbor" (knn) query), and which may also be limited to a maximum radius of search. In such a circumstance, results found by query resolver 485 would need to be compared or sorted in order to properly identify the responsive records. Query resolver 485 may not have enough working memory to store these results. Therefore, an approach to implementing a knn query is to emit a series of nearest neighbor queries, but each query tracks, as a minimum distance, the distance of the previously-identified record. This minimum distance also may contain identifying information about the previously-identified record. This information allows differentiating two records that are not located at the same distance (within a precision of the test).

Figure 15B:
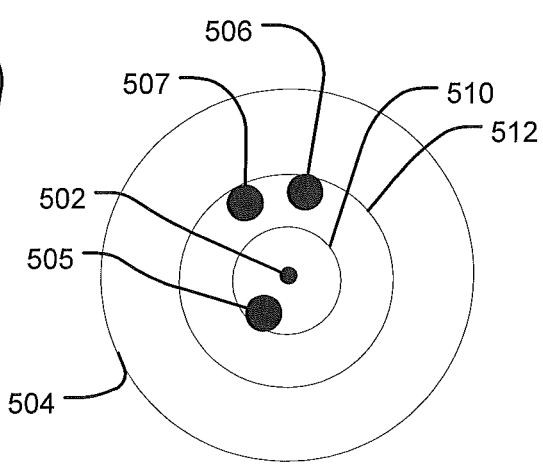

FIG. 15B depicts a more specific example of how a knn (where k=3) query can be implemented. Initially, a query is made that requests the single nearest record to locus 502. This query returns record 504. A subsequent query is made, which includes information about the distance from the previous closest record returned (represented as radius 510). Query resolver 485 can thus exclude from search any portions of space closer to locus 502 than this distance. Query resolver 485 may find that both record 507 and record 506 have the same distance from locus 502. Query resolver 485 would operate to select from record 506 and 507 one record to return, according to identifier information for each record. For example, query resolver 485 may select a record with a sequentially earlier ID. For example, the second query may return record 506, which is associated with radius 512. A third query is emitted, and is associated with radius 512 and identifying information derived from record 506 (e.g., a selected number of low order bits from an ID). If query resolver finds record 506 first, then it can exclude this record based on the identifier bits, and then ultimately will find record 507, and return that record.

Such an approach is appropriate where query resolver 485 may be a fixed function or limited programmability circuit that has only a small amount of storage available when resolving each query (e.g., may have space only for identifying information for a single record). In such case, each time query resolver identifies a record that may be responsive to a query, it may need either to return that record or to replace an existing stored identifier. Such a query resolver can deterministically respond to a nearest-neighbor query, and by extension according to the above-described technique, to a knn, k>1, query.

Figure 16:
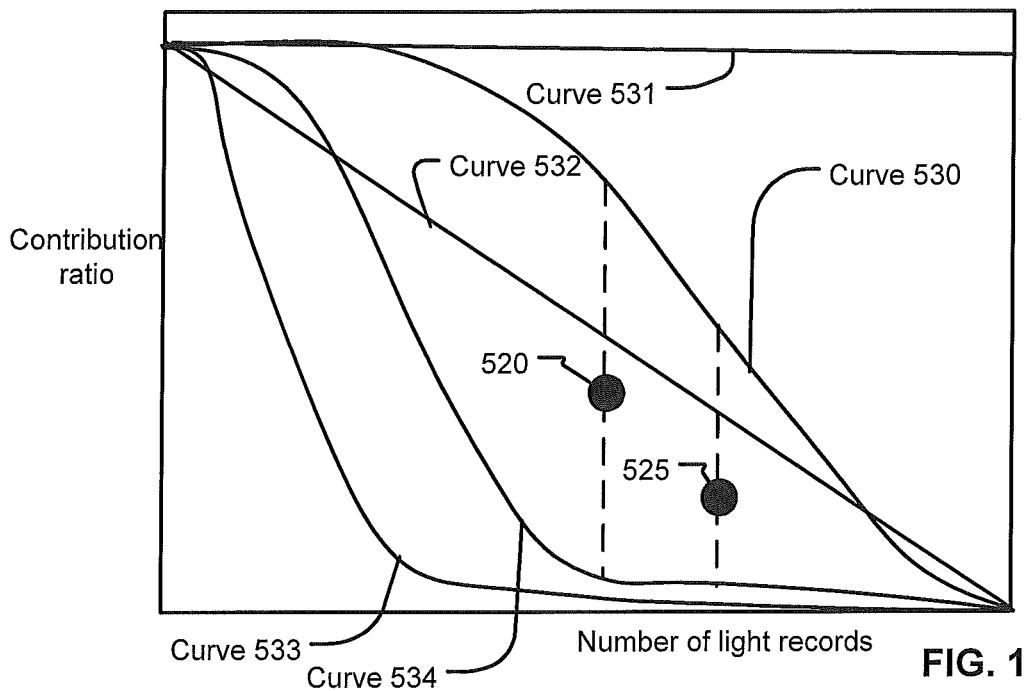
FIG. 16 depicts a plurality of weighting curves that can be applied to data for records determined to be responsive to a given query.

FIG. 16 is used to describe aspects of techniques to abstract records identified for a query, and present a combined result. These techniques can be used to increase determinism in an amount of data traffic that will be generated by a query, reduce query buffering requirements, and provide hardware acceleration for processing query results, and allowing artist control over aspects of hardware accelerated filtering or abstracting of query results. More particularly, FIG. 16 depicts an example set of curves 530-534 that have, as an independent variable, a number of light records and as dependent variable, a contribution ratio. In some implementations, these curves are for a set of light records organized by increasing distance from a particular locus. Thus, in some approaches, each of the curves describes a different overall weighting for a set of light records organized into increasing distance order. For example, curve 532 describes a linear decrease in contribution ratio for each incremental light record discovered, while curves 534 and 533 describe a faster drop off of contribution ratio.

An implication of these techniques is that light records at different distances from a locus can be blended according to different strategies, and based on relative location or density of other light records. For example, in the linear curve 532, each incremental record can be weighted by a linearly decreasing weight. In some approaches, the total weighting can be a constant value, e.g., such that the blending does not amplify a total energy represented by the records, but rather blends to produce a constant-energy result. These curves can be structured so that they have pre-defined weightings for each incremental record, assuming a pre-determined number of records; they also can be parameterized, such that the weighting of each record is determined based on a total number of records that was discovered. Determining final weights for each record based on a total number of records discovered can be implemented by first determining a total number of records before weighting each record and accumulating that output into a summation.

Additionally, two or more of these curves can be blended together in order to arrive at an interpolated curve. For example, if curve 532 is weighted for 15 records, while curve 534 is weighted for 8 records, then if 10 records are identified for a given query, the weightings for those records can be determined by blending the weightings described by each of these curves.

Figure 18:
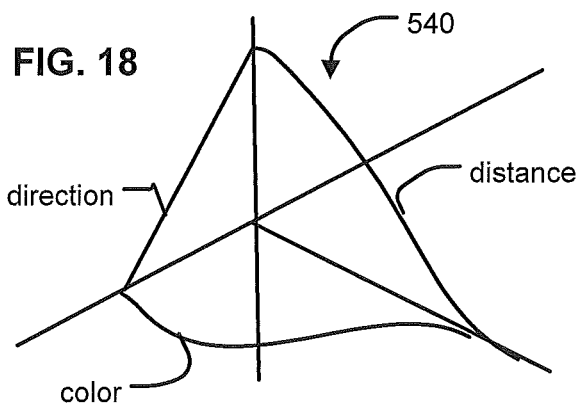
FIG. 18 depicts that blending functions and queries can have different relative weightings or priorities for a variety of different characteristics of records within a set of records.

In some implementations, a set of curves can be pre-defined and stored or encoded in circuitry accessible to query resolver 485, and can be part of abstraction modeling processes 493. In some implementations, the order and shape of the curves can be specified by different polynomials. A selection of one or more polynomials and parameters for those polynomials can be passed with a query. A query can specify a volume to be searched for records in any of a variety of ways, such as a locus of one or more points and a distance from those points, extrusions, boxes, spheres, and so on. Some queries may not explicate a maximum volume, but instead may specify a maximum number of records. Some queries may specify a directionality to exclude certain records. For example, a query may require that directions of records have positive dot products with a direction specified by the query. FIG. 18 provides more details concerning examples of query definition options.

Figure 17:
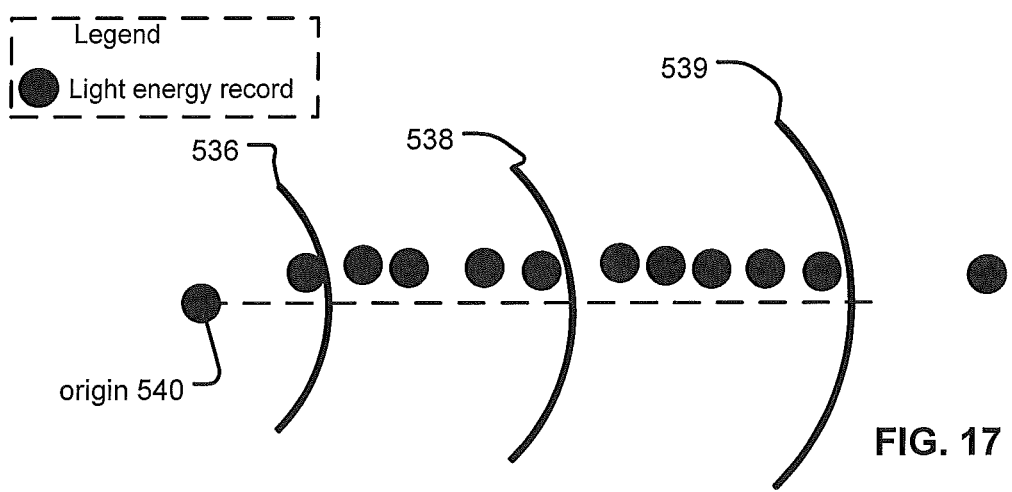
FIG. 17 depicts an increasing distance ordering of light records, related to abstracting data from records responsive to a query.

FIG. 17 depicts an example where different queries 536, 538 and 539 have different maximum radii from origin 540, and therefore include different sets of records. The records that are discovered with respect to each of the queries can be blended in accordance with a selected curve from FIG. 16. For example, if the records identified for query 538 were blended according to curve 533, and curve 533 transitioned from high to low between 2 and 4 records, then the $5^{th}$ record would have a relatively small contribution to the weighted sum while the first record would have a much higher contribution. If curve 534 finished transitioning at around 6 records, and curve 532 finished transitioning at 12, then a blending between curve 534 and curve 532 may be used to blend the set of 10 records identified by query 539.

FIG. 18 depicts that blending can be controlled based on a variety of characteristics, which can include those specified by the query, and also those of the records themselves. FIG. 18 shows that a query can specify a blending curve for each of a number of different characteristics of light energy records. For example, similarity of direction can be one factor in an ultimate weighting determination, color (or more generally spectral content) of the light energy records can be another, and distance from a specified locus yet another example characteristic. These curves collectively can specify a final weighting function. In some examples, different channels of a record can be weighted differently. These options can be specified by a query. Such a query can reference a convention of prearranged query profiles, other selections of combinations of search criteria. Query resolver circuitry can be provided to accelerate such searches.

Figure 19:
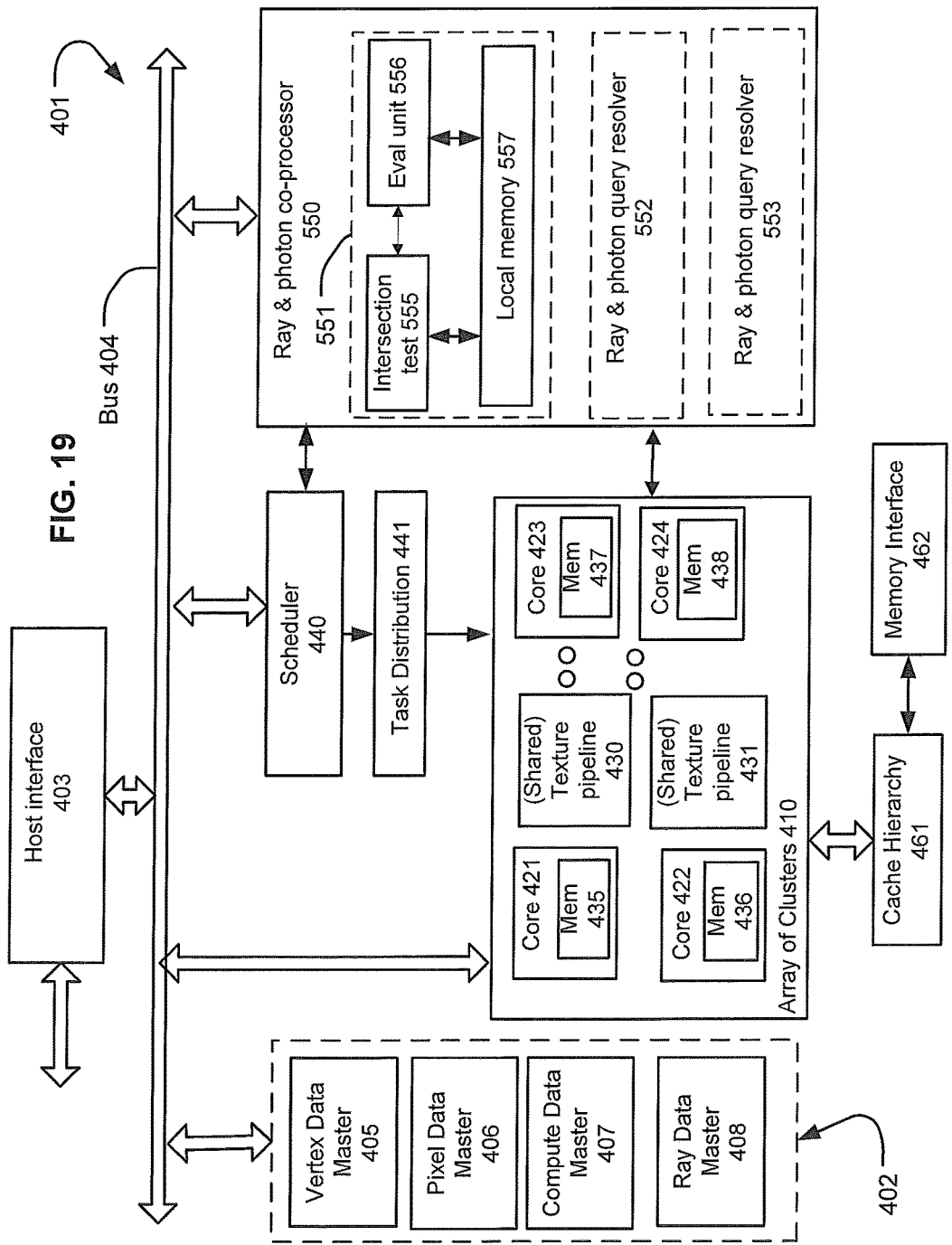
FIG. 19 depicts an example system for query resolution which has a plurality of query resolver units that can each have limited programmability circuits for performing specified functions.

FIG. 19 depicts a modified version of the example system 401, where a ray and photon co-processor 550 is provided and comprises a set of resolver units 551-553. Each resolver unit 551-553 contains an intersection test unit, an evaluation unit 556, and a local memory 557. Intersection test unit 555 can return a closest intersection result for a shape. The shape may be a primitive composing scene geometry, an element of an acceleration structure, displaced or implicit geometry, or another surface that can be defined and tested for intersection with a ray. Evaluation unit 556 may implement aspects of the query-related disclosures described above. Evaluation unit 556 may comprise circuitry that can only execute non-branching instruction streams, for example. Evaluation unit 556 may comprise circuitry that can evaluate a specified set of polynomials, such as a linear and a quadratic polynomial, for a set of coefficients and a value of the independent variable. Evaluation unit 556 also may include a multiplier unit, such as an integer, fixed point, single or double precision floating point unit. The multiplier may use a block floating point representation of one or more of the multiplicands. Evaluation unit 556 also may implement an accumulator that can accumulate results of these calculations into a buffer.

Evaluation unit 556 also may be used to accelerate portions of an algorithm that is being predominantly executed on intersection test unit 555, a core in array 410, or a combination thereof. For example, evaluation unit 556 may return a stream of function evaluations, where the one or more independent variables is incremented according to a step size, such as a step size set by intersection test unit 555. This stream of evaluations may be used to perform volumetric rendering techniques, ray marches, cone marches, and so on. In one example, evaluation unit 556 may be programmed to continue to evaluate an expression until an output of that expression changes sign, and then report current values for one or more independent variables. Unit 556 may output multiple values within a specified range of the sign change, such as a previous and current value, bracketing a zero crossing point of the expression.

FIG. 20 depicts an example process that summarizes aspects disclosed herein. At 561, a query can be received for processing. At 563, records within a volume defined by the query are identified. These records are abstracted according to an abstraction model applied to the records, to produce a query result. Such query result may be of the same or similar format to a query result that would have been returned for a single light energy record, or may express some aspect of a distribution of the records identified. At 567, the query result is returned.

FIG. 21 depicts an example process of query abstraction. At 569, one or more records that were within the volume can be rejected based on a rejection criteria (e.g., directionality comparison). This is an appropriate approach where a tester may first identify a record within a specified volume, but does not test other query parameters, but instead identifies such records for further analysis. At 571, remaining records can be counted, and at 573, relative weighting or blending criteria can be defined, or selected. At 575, these records are weighted and at 577, the weighted values are summed to produce a query result. At 578, results of different of the weighting or blending criteria can be interpolated. In an example, each weighting function can be tuned for a pre-determined number of records, and after a total number of records determined to be responsive to the query is determined, a result from any one of the weighting or blending processes can be selected, such as according to a closest pre-determined number to the actual number of records. In an implementation, two of the results from different weighting or blending processes can be interpolated, if their pre-determined numbers bracket the actual number of records determined to be responsive.

FIG. 22 further depicts aspects of an implementation of these disclosures. A general purpose programmable unit 591 executes shader code 589. Shader code 589 emits a query 480, which may comprises one or more of query bounding info 604, materials properties 605, program references 607, and parameters 609. An example of material properties 605 includes a Bidirectional Reflectance Distribution Function (BRDF). In such a case, a BRDF for a material can be supplied by a query, and that BRDF can be used in calculating a result returned in response to query 480. As a particular example, a calculation can be made that determines how much energy of a distribution defined by a light energy record is emitted within a boundary defined by the BRDF.

A query may be expressed by shader code 589 in a format supported by Application Programming Interface (API) 484. API 484 can be implemented by computer executable modules that provide an interface that accepts a set of parameters and other information for query 593, represented by query specifier module 595. Query specifier module 595 can produce one or more constituent query specifications appropriate for capabilities of a query resolver 597, which would provide results of query 593. For example, a knn query call may be supported by API 484, which converts such a query into a set of query specifications that are each served by underlying hardware, and the results of these separate query specifications collectively define the results for the knn search. FIG. 22 also depicts that a feedback loop may be provided to query specifier 595 from query resolver 485. Query resolver 485 may provide results (e.g., results 601-603) as they are available to a simple program execution unit 611. When query resolver 485 completes the query, by identifying all responsive queries, query resolver 485 may provide a completion indication 604. Such indication may also be provided with a last result returned for a query.

Simple execution unit 611 can be configured with a program from program store 613. Such program can have specific limitations appropriate to characteristics of simple program execution unit 611. For example, some execution units may not support branch instructions, may perform only in-order instruction execution, may not support conditionals, or may not support looping, as examples. These limitations may be made in order to reduce an amount of silicon required to implement the execution unit, and/or to avoid or reduce branching code. In one example, a program can be implemented as a set of instructions for one increment or step of an algorithm. Such program can report intermediate result of one or more increments, or only a final result. Then, query resolver 485 may supply information for a subsequent step or increment. For example, simple program execution unit 611 may implement one step of a ray march, or cone march, volume rendering operation, texture coordinate interpolation, volume interpolation, function evaluation for an incremented independent variable, and so on. A program or programs executed by simple program execution unit 611 may be identified by program reference(s) 607, supplied with query 480. Another approach to simple program execution unit 611 is to provide a set of math function models 615 that can selectively be chosen to be implemented by execution unit 611. As an example, these models may include polynomial functions. Parameters and a current value or values for the independent variable(s) may be supplied with query 480. These parameters and current values also may be supplied or updated from initial values by query specifier 595. For example, where execution unit 611 can evaluate a function, and return that evaluation result to query resolver 485, which may decide to increment a variable or change a parameter, and request re-evaluation of that function.

Execution unit 611 also may cooperate with a local accumulation function 617 that accepts values from execution unit 611 and accumulates these into a buffer location. In one example, the accumulation may include a simple summation, such as where execution unit 611 performed a weighting that accounts for values already accumulated in the buffer. In other situations, local accumulation may track more statistics concerning values that were accumulated, Local accumulation 617 may be implemented as a write instruction to a specific part of a local memory; in some implementations, this memory is not protected from incorrect program execution, such that execution unit 611 may update this value without arbitrating for access. That locally accumulated value may be returned to a global result buffer 618 after a final accumulation. The global buffer location may be specified by query 480. Execution unit 611 also may be used to automate or accelerate other rendering tasks. As an example, differentials may be associated with rays. A differential for a ray can be modeled by tracing two or more additional rays that travel generally in the same direction as the original ray, but are not exactly co-parallel. In order to make use of the ray differential, a model of where these additional rays intersect with respect to the original ray can be made. Execution unit 611 can evaluate a function that approximates where each additional ray would have hit, based on its direction and a model of the surface intersected by the original ray. In one example, a tangent plane at an intersection point can be defined and based on an angle formed between each differential ray and the original ray, execution unit 611 can evaluate a function to identify an intersection position on this tangent plane. Thus, for a given intersection between a ray and a surface, execution unit can identify intersection points for the differential rays. These points can be expressed parametrically on a surface (e.g., a tangent plane).

The term "light energy characterization" is used here to include any kind of directed flow of energy or other material, such as for modeling or quantifying intensity and/or directionality of energy propagation. A 'light energy record" refers to data associated with a point in an n-dimensional space (e.g., n=3) which characterizes propagation of energy. For example, the record can include data that characterizes radiance, such as radiance of light, or propagation of electromagnetic wave energy. Such records can include data characterizing energy inbound to or outbound from a point on a surface, or existing in a region of a defined locus or defined volume. Different records can cover different volumes of space and can have overlapping volumes. Different records can represent the same or partially-overlapping volume at a different level of abstraction. As a general example, propagating electromagnetic waves, such as x-rays, microwaves or radio frequency waves can be modeled using such energy characterization data, as can infrared radiation. Thus, using the term "light" implies no limitation as to the kinds of energy or transport thereof capable of being modeled by implementations of the disclosure. In the disclosure, lighting and shading information can be produced and can be accessed. Some lighting and shading information serves as inputs to other processes that ultimately produce a final rendered output. Thus, shading information may not be a final product, but an intermediate thereof. Such intermediate data can take a variety of forms and need not directly express color, luminance, chrominance or the like. An example of a light energy record, in the context of 3-D rendering, is a "photon", as used in the context of 3-D rendering applications, but light energy records do not need to conform to implicit or explicit limitations of "photons".

As would be apparent from the disclosure, some of the components and functionality disclosed may be implemented in hardware, software, firmware, or any combination thereof. If implemented in firmware and/or software, the functions may be stored as one or more instructions or code on a computer-readable medium, in one example, the media is non-transitory. Examples include a computer-readable medium encoded with a data structure and a computer-readable medium encoded with a computer program. Machine-readable media includes non-transitory machine readable media. Other kinds of media include transmission media. A non-transitory medium may be any tangible medium that can be accessed by a machine. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a machine.

Those of skill will also appreciate that the various illustrative logical blocks, modules, circuits, and algorithm steps described in connection with the embodiments disclosed herein may be implemented as electronic hardware, computer software in a computer-readable medium, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Modern general purpose processors regularly require in excess of two billion transistors to be implemented, while graphics processing units may have in excess of five billion transistors. Such transistor counts are likely to increase. Designs have used these transistors to implement increasing complex functionality and to increase parallelism. As such, it becomes increasingly necessary to be able to describe or discuss technical subject matter concerning such processors, whether general purpose or application specific, at a level of detail appropriate to the technology being addressed. In general, a hierarchy of concepts is applied to allow those of ordinary skill to focus on details of the matter being addressed.

Describing portions of a design (e.g., different functional units within an apparatus or system) according to functionality provided by those portions is often an appropriate level of abstraction, rather than exhaustively describing implementations of such portions, since each of these portions may themselves comprise hundreds of thousands or millions of gates and millions, tens of millions or hundreds of millions of transistors. When addressing some particular feature or implementation of a feature within such portion(s), it may be appropriate to identify substituent functions or otherwise characterize some sub-portion of that portion of the design in more detail, while abstracting other sub-portions or other functions.

A precise logical arrangement of the gates and interconnect (a netlist) implementing a portion of a design (e.g., a functional unit) can be specified. However, how such logical arrangement is physically realized in a particular chip (how that logic and interconnect is laid out in a particular design) still may differ in different process technology and for a variety of other reasons. To the extent that circuitry implementing particular functionality may be differently within different contexts, disclosure of a particular circuit may not be particularly helpful. Also, many of the details concerning producing netlists for functional units as well as actual layout are determined using design automation, proceeding from a high level logical description of the logic to be implemented (e.g., a "hardware description language"). As such, it is often unnecessary and/or unhelpful to provide more detail concerning a portion of a circuit design than to describe the functionality to be provided.

The term "circuitry" does not imply a single electrically connected set of circuits. Circuitry may be fixed function, configurable, or programmable. In general, circuitry implementing a functional unit is more likely to be configurable, or may be more configurable, than circuitry implementing a specific portion of a functional unit. For example, a "simple execution unit" according to the disclosure is less configurable than an Arithmetic Logic Unit (ALU) of a processor may reuse the same portion of circuitry differently when performing different arithmetic or logic operations. As such, that portion of circuitry is effectively circuitry or part of circuitry for each different operation, when configured to perform or otherwise interconnected to perform each different operation. Such configuration may come from or be based on instructions, or microcode, for example.

For example, a "query specifier module" may be implemented by machine code configuring a configurable or programmable processing unit, such as a core or a set of programmable cores. Thus, such a programmable processing unit, as configured by the machine code, becomes query specifier circuitry, where a person of ordinary skill would understand that the term "query specifier" describes functionality disclosed in the specification for such query specifier module, such as providing an interface that accepts a set of parameters and other information for a query and produce a query specification that is appropriate for capabilities of a query resolver that will service the query.

In all such cases, describing portions of an apparatus or system in terms of its functionality conveys structure to a person of ordinary skill in the art. In the context of this disclosure, the term "unit" refers, in some implementations, to a class or group of circuitry that implements the functions or functions attributed to that unit. Such circuitry may implement additional functions, and so identification of circuitry performing one function does not mean that the same circuitry, or a portion thereof, cannot also perform other functions. In some circumstances, the functional unit may be identified, and then functional description of circuitry that performs a certain feature differently, or implements a new feature may be described. As such, a "unit" may be formed of one or more circuits that implement a function or functions, where one or more of the circuits may be composed of configurable or programmable logic elements. Examples of logic elements include portions of ALUs, and a combination of switches and interconnect that implement logical expressions, such as Boolean logic expressions.

In some cases, a structure or structures implementing a given unit or module may have permanent physical differences or adaptations compared with structure(s) implementing other modules or units within an apparatus or system. However, such structure(s) also may be produced by a temporary adaptation or configuration, such as one caused under program control, microcode, or other source of configuration.

Different approaches to design of circuitry exist, for example, circuitry may be synchronous or asynchronous with respect to a clock. Circuitry may be designed to be static or be dynamic. Different circuit design philosophies may be used to implement different functional units or parts thereof. Absent some context-specific basis, "circuitry" encompasses all such design approaches.

Although circuitry or functional units described herein may be most frequently implemented by electrical circuitry, and more particularly, by circuitry that primarily relies on a transistor implemented in a semiconductor as a primary switch element, this term is to be understood in relation to the technology being disclosed. For example, different physical processes may be used in circuitry implementing aspects of the disclosure, such as optical, nanotubes, microelectrical mechanical elements, quantum switches or memory storage, magnetoresistive logic elements, and so on. Although a choice of technology used to construct circuitry or functional units according to the technology may change over time, this choice is an implementation decision to be made in accordance with the then-current state of technology. This is exemplified by the transitions from using vacuum tubes as switching elements to using circuits with discrete transistors, to using integrated circuits, and advances in memory technologies, in that while there were many inventions in each of these areas, these inventions did not necessarily fundamentally change how computers fundamentally worked. For example, the use of stored programs having a sequence of instructions selected from an instruction set architecture was an important change from a computer that required physical rewiring to change the program, but subsequently, many advances were made to various functional units within such a stored-program computer.

Functional modules may be composed of circuitry, where such circuitry may be fixed function, configurable under program control or under other configuration information, or some combination thereof. Functional modules themselves thus may be described by the functions that they perform, to helpfully abstract how some of the constituent portions of such functions may be implemented.

In some situations, circuitry and functional modules may be described partially in functional terms, and partially in structural terms. In some situations, the structural portion of such a description may be described in terms of a configuration applied to circuitry or to functional modules, or both.

The description of the aspects and features is provided to enable any person skilled in the art to make and use the systems, apparatuses and perform the methods disclosed. Various modifications will be readily apparent to those skilled in the art, and the principles described in this document may be applied to other aspects without departing from the spirit or scope of the disclosure. Thus, the description is not intended to limit the claims. Rather, the claims are to be accorded a scope consistent with the principles and novel features disclosed herein.

The drawings include relative arrangements of structure and ordering of process components, solely as an aid in understanding the description. These relative arrangements and numbering is not an implicit disclosure of any specific limitation on ordering or arrangement of elements and steps in the claims. Process limitations may be interchanged sequentially without departing from the scope of the disclosure, and means-plus-function clauses in the claims are intended to cover the structures described as performing the recited function that include not only structural equivalents, but also equivalent structures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than, additional to, or less than, those identified herein. Rather, the described features and steps are disclosed as examples of components of systems and methods within the scope of the appended claims.

What is claimed is:

1. A system for providing global illumination data for rendering from a 3-D scene, the system comprising a query resolver configured to:

receive a query defining a sub-portion of the 3-D scene for which light energy transport data is to be returned, the query emitted from a shader module executed on a processor;

search a set of light energy records to identify records within the sub-portion of the 3-D scene, where each record has a location in the 3-D scene and includes data relating to light energy transport in a portion of the 3-D scene; and apply an abstraction process to the identified records to produce an abstracted result for the query and return the abstracted result to the shader module, wherein the abstracted result is used by the shader module in rendering from the 3-D scene.

2. The system according to claim 1, wherein the query resolver is implemented by fixed or limited function circuitry that is coupled to receive queries for resolution from at least one processor executing machine code that uses results from the queries during performing of shading processes.

3. The system according to claim 1, wherein applying an abstraction process includes applying a plurality of abstraction functions to the identified records, wherein each of the plurality of abstraction functions applies a different set of relative weights to the identified records.

4. The system according to claim 1, wherein applying an abstraction process includes counting a number of identified records, and interpolating between results of two abstraction processes when the counted number of identified records is between respective pre-determined number of records of those two abstraction processes.

5. The system according to claim 1, wherein the query comprises a directional indication, and wherein the query resolver is configured to use the directional indication to compare directions of light energy transport in the light energy records, and exclude records that do not conform to the directional indication in the query.

6. The system according to claim 1, wherein the query resolver is configured to produce an ordering of the identified records, based on relative distance from a locus defined by the query.

7. The system according to claim 6, wherein the query resolver is configured to apply a weighting function to each record which uses that record's place in the ordering to determine a weight to be applied to the light energy transport data in that record.

8. The system according to claim 1, wherein the query includes information for a function to be used in generating relative weightings for each record identified in order to produce the abstracted result.

9. The system according to claim 8, wherein the query includes a selection of a polynomial and coefficients for the polynomial, wherein the polynomial is evaluated incrementally, as records are identified in increasing-distance order from a locus specified in the query.

10. A method for providing global illumination data for rendering from a 3-D scene, the method comprising:

receiving, at a query resolver, a query defining a sub-portion of the 3-D scene for which light energy transport data is to be returned, the query emitted from a shader module executed on a processor;

searching, using the query resolver, a set of light energy records to identify records within the sub-portion of the 3-D scene, where each record has a location in the 3-D scene and includes data relating to light energy transport in a portion of the 3-D scene; and applying, using the query resolver, an abstraction process to the identified records to produce an abstracted result for the query and returning the abstracted result to the shader module, wherein the abstracted result is used by the shader module in rendering from the 3-D scene.

11. The method according to claim 10, wherein the query resolver is implemented by fixed or limited function circuitry that is coupled to receive queries for resolution from at least one processor executing machine code that uses results from the queries during performing of shading processes.

12. The method according to claim 10, wherein applying an abstraction process includes applying a plurality of abstraction functions to the identified records, wherein each of the plurality of abstraction functions applies a different set of relative weights to the identified records.

13. The method according to claim 10, wherein applying an abstraction process includes counting a number of identified records, and interpolating between results of two abstraction processes when the counted number of identified records is between the respective pre-determined number of records of those two abstraction processes.

14. The method according to claim 10, wherein the query resolver is operable to perform a march of a ray using a defined step size, and wherein an execution unit in the query resolver is configurable to evaluate a function at each point along the march and wherein the function is identified by geometry within a bounding volume within which the ray is to be marched.

15. The method according to claim 10, wherein the query comprises a directional indication, and further comprising using, at the query resolver, the directional indication to compare directions of light energy transport in the light energy records, and excluding records that do not conform to the directional indication in the query.

16. The method according to claim 10, further comprising producing an ordering of the identified records based on relative distance from a locus defined by the query and applying, at the query resolver, a weighting function to each record which uses the position of that record in the ordering to determine a weight to be applied to the light energy transport data in that record.

17. The method according to claim 10, wherein the query includes information for a function to be used in generating relative weightings for each record identified in order to produce the abstracted result.

18. The method according to claim 17, wherein the query includes a selection of a polynomial and coefficients for the polynomial, wherein the polynomial is evaluated incrementally, as records are identified in increasing-distance order from a locus specified in the query.

* * * * *